United States Patent
Wozniak

(10) Patent No.: US 12,245,593 B2
(45) Date of Patent: Mar. 11, 2025

(54) AGRICULTURAL PRODUCTS AND RELATED METHODS

(71) Applicant: CYTOZYME LABORATORIES, INC., Salt Lake City, UT (US)

(72) Inventor: Elizabeth Wozniak, Sandy, UT (US)

(73) Assignee: CYTOZYME LABORATORIES, INC., Salt Lake City, UT (US)

( * ) Notice: Subject to any disclaimer, the term of this patent is extended or adjusted under 35 U.S.C. 154(b) by 0 days.

(21) Appl. No.: 16/617,769

(22) PCT Filed: Jun. 1, 2018

(86) PCT No.: PCT/US2018/035731
§ 371 (c)(1),
(2) Date: Nov. 27, 2019

(87) PCT Pub. No.: WO2018/223087
PCT Pub. Date: Dec. 6, 2018

(65) Prior Publication Data
US 2020/0100506 A1 Apr. 2, 2020

Related U.S. Application Data

(60) Provisional application No. 62/514,463, filed on Jun. 2, 2017.

(51) Int. Cl.
*A01N 63/20* (2020.01)
*A01N 37/34* (2006.01)
*A01N 37/50* (2006.01)
*A01N 43/54* (2006.01)
*A01N 43/653* (2006.01)
*A01N 45/02* (2006.01)
*A01N 57/20* (2006.01)
*A01P 13/00* (2006.01)

(52) U.S. Cl.
CPC ............ *A01N 63/20* (2020.01); *A01N 37/34* (2013.01); *A01N 37/50* (2013.01); *A01N 43/54* (2013.01); *A01N 43/653* (2013.01); *A01N 45/02* (2013.01); *A01N 57/20* (2013.01); *A01P 13/00* (2021.08)

(58) Field of Classification Search
CPC ...... A01N 63/20; A01N 43/54; A01N 43/653; A01N 37/34
See application file for complete search history.

(56) References Cited

U.S. PATENT DOCUMENTS

| | | | |
|---|---|---|---|
| 5,747,450 | A | 5/1998 | Ohba et al. |
| 2012/0004107 | A1 | 1/2012 | Jenkins |
| 2014/0033361 | A1 | 1/2014 | Altier et al. |
| 2015/0080261 | A1 | 3/2015 | Wigley et al. |
| 2016/0081335 | A1* | 3/2016 | Van Den Eynde .... A01N 37/34 514/521 |
| 2016/0227788 | A1 | 8/2016 | Frank et al. |

FOREIGN PATENT DOCUMENTS

| | | |
|---|---|---|
| CN | 104825381 A | 8/2015 |
| CN | 106748336 A | 5/2017 |
| WO | 2010/110677 A1 | 9/2010 |
| WO | 2011057006 A2 | 5/2011 |
| WO | 2014066878 A1 | 5/2014 |
| WO | 2015057600 A1 | 4/2015 |
| WO | 2016/160955 A1 | 10/2016 |

OTHER PUBLICATIONS

Wisconsin Department of Natural Resources, "Glyphosate Chemical Fact Sheet", DNR PUB-WT-973 2012 (Year: 2012).*
M. Tu et al., "Glyphosate", Weed Control Methods Handbook, The Nature Conservancy, pp. 7e.1-7e.10, last updated Nov. 2001 (Year: 2001).*
International Search Report and Written Opinion dated Sep. 7, 2018, issued in PCT Application No. PCT/US2018/035731, filed Jun. 1, 2018.
Anders Broberg et al., *Metabolite Profiles of Lactic Acid Bacteria ion Grass Silage*, Applied and Environmental Microbiology, Sep. 2007, pp. 5547-5552.
Rania et al., "Medical importance of Lactobacillus fermentum lysate as a bioactive agent against some pathogenic Candida and Aspergillus strains", African Journal of Microbiology Research, vol. 7, No. 40, Oct. 4, 2013, pp. 4817-4827.
Turner et al., "Complexing Agents as Herbicide Additives//Komplexbildner ALS Additive Fuer Herbizide//Les Agents Complexants En Tant Qu'adjuvants Pour Les Herbicides", Weed Research, Blackwell Scientific Publ., Oxford, vol. 18, No. 4, Jan. 1, 1978, pp. 199-207.
Stamenkovic, Sandra, "Microbial fertilizers: A comprehensive review of current findings and future perspectives", Spanich Journal of Agricultural Research, Mar. 2018, vol. 16, Issue 1, pp. 1-18.
European Search Report and Opinion dated Sep. 29, 2022, issued in PCT Application No. PCT/US2019065103.
Castle Linda A et al: "Discovery and directed evolution of a glyphosate tolerance gene", Science, vol. 304, No. 5674, (May 21, 2004), pp. 1151-1154, XP002470810, DOI: 10.1126/SCIENCE. 1096770.
Office Action received for European Patent Application No. 18809338. 9, mailed on Jan. 20, 2022, 5 pages.

* cited by examiner

Primary Examiner — Bethany P Barham
Assistant Examiner — Barbara S Frazier
(74) Attorney, Agent, or Firm — Workman Nydegger

(57) ABSTRACT

Plant treatment products include a plant treatment component and, preferably mixed with, a microbial fermentation product. The microbial fermentation product includes cellular material of cultured microorganisms and one or more anaerobic metabolite products of the cultured microorganisms. Preferably, the microbial fermentation product comprises a whole culture lysate of a microbial fermentation suspension culture, including liquid fermentation culture medium components and lysed microorganisms. The plant treatment component of the product includes one or more pesticides or plant growth regulators. Plant treatment products can be applied to or around plants or seeds to enhance growth, health, or productivity of the plants.

13 Claims, No Drawings

AGRICULTURAL PRODUCTS AND RELATED METHODS

BACKGROUND

1. Technical Field

The present disclosure relates to plant management and more particularly to plant treatment products and to methods of manufacturing and using the same.

2. Related Technology

Crop protection is an important part of crop management, and may lead to decreased disease and increased crop yield. However, many problems arise from using conventional synthetic crop protection products, such as herbicides, insecticides, bactericides or fungicides. These products are often non-specific and may disrupt the natural healthy biome of crops. Further, because of their synthetic nature, these products can be toxic to humans and animals and leave toxic residues in the crop or environment. Repeated use of synthetic chemicals that have a specific, single mode of action frequently leads to formation and/or selection of resistant organisms.

Additionally, consumers around the world have become aware of potential environmental and health problems associated with residual chemicals in food and ground water, and have begun pressuring growers to reduce use of synthetic chemicals in production of food chain crops. Accordingly, there are a number of disadvantages in the field of crop protection that can be addressed. In one aspect, for instance, what is needed is new crop protection alternatives which alone or in combination with reduced rates of synthetic chemicals will satisfy consumer demand, reduce risk of pest resistance, and produce healthier crops.

BRIEF SUMMARY

Embodiments of the present disclosure solve one or more of the foregoing or other problems in the art with products and methods for treating, supplementing, or protecting plants, especially crops. Specifically, embodiments of the present disclosure include plant treatment products and methods of manufacturing and/or using the same (e.g., to enhance the health of plants). Some embodiments relate to a plant treatment product that includes (i) one or more plant treatment (or crop protection) components and (optionally mixed with) (ii) one or more microbial fermentation products or components. One or more additional products or components can be included in some embodiments. Some embodiments relate to methods of manufacturing the product. Some embodiments relate to methods of using the product. For instance, embodiments can include a method of treating a plant or crop. Illustrative (crop treatment) methods can include the step of co-applying (or co-administering) the product or components thereof to a plant or crop.

Various illustrative plant treatment components can include at least one pesticide (e.g., one or more (synthetic) chemical, molecule, or compound, or a mixture of two or more (synthetic) chemicals, molecules, or compounds). Pesticides can be or comprise one or more of the following: (1) an insecticide (e.g., against Lepidopterans, Hemipterans, Dipterans, Coleopteras, etc.), (2) a non-insecticide pesticide (e.g., against rodents, amphibians, etc.), (3) an antimicrobial (e.g., a fungicide, bactericide, antibiotic, antiparasitic, antiviral, etc.), (4) an herbicide (selective or non-selective), and (5) a nematicide. The plant treatment product, or plant treatment component thereof, can also or alternative include at least one plant growth regulator (PGR) (e.g., one or more hormone, such as an auxin, gibberellin, cytokinin, abscisic acid (ABA), and/or ethylene, or a mixture of two or more hormones). In some embodiments, the plant treatment product or plant treatment component thereof can include a fertilizer. In a preferred embodiment, the plant treatment product or plant treatment component can be (substantially or entirely) devoid of one or more fertilizers (e.g., urea and/or nitrogen-containing fertilizers). The plant treatment product or plant treatment component can be in substantially dry or liquid form.

An illustrative microbial fermentation product can include (1) cellular material from one or more microorganisms and (2) one or more anaerobic metabolic products of one or more microorganisms. Illustratively, the cellular material can comprise cellular (e.g., molecular and/or structural) components of one or more non-living (e.g., lysed) microorganisms, preferably prokaryotic bacteria. In some embodiments, the metabolites are metabolites of (or were produced by) said microorganism(s). In some embodiments, the microorganism(s) can be or include bacteria, preferably a species or strain of *Lactobacillus* (e.g., *acidophilus*, etc.), as described herein. In some embodiments, the microorganism(s) can include one or more (additional) microbial (e.g., bacterial) species and/or strains (e.g., other than a (first) *Lactobacillus* species or strain). Alternatively, or in addition, the cellular material can comprise cellular components or an extract of one or more fungus (e.g., yeast) and/or algae species or strains. In some embodiments, the fermentation product can include one or more components of a (fermentation) culture medium. In some embodiments, the fermentation product can be or comprise a microbial (liquid) fermentation culture.

Certain embodiments can be substantially and/or entirely devoid of probiotic and/or living microorganism of one or more variety. For instance, in some embodiments, the microbial fermentation product can comprise a whole culture lysate of a microbial suspension (fermentation) culture. The culture can be lysed so as to be substantially and/or entirely devoid of probiotic and/or living microorganism. The culture and/or lysate thereof can include a liquid medium, lysed microbial components, and anaerobic metabolites of the lysed microorganisms. The culture and/or lysate thereof can include and one or more additives or medium components.

The plant treatment product or microbial fermentation product can include one or more additives (or additional components) selected from: (1) amino acids, (2) peptides, (3) hydrolyzed proteins, (4) organic acids and/or carboxylic acids, (5) carbohydrates, (6) plant extracts and/or seaweed extracts, (7) lignosulfonates, (8) humic acids and/or fulvic acids, (9) macro-nutrients, secondary-nutrients, and/or micro-nutrients, (10) chelated minerals and/or complex minerals, (11) vitamins, (12) wetting agents, (13) dispersants, and (14) surfactants. Some embodiments can include a mixture of two or more of the foregoing. Some embodiments can include a mixture amino acids, minerals, and organic acids. In some embodiments, the one or more additives can be included in the (active or live) culture or added to the lysate. In other embodiments, the one or more additives can be added to the plant treatment product (or to a mixture of the microbial fermentation product and the plant treatment component).

In some embodiments, the microbial fermentation product can be in liquid or suspension form. In some embodiments, the microbial fermentation product can be in dry, substantially dry, or partially dry form. For example, at least one embodiment, the microbial fermentation product can be applied, bound to, or mixed with a carrier or excipient. Illustratively, the carrier can comprise a naturally-occurring earth component, such as a phyllosilicate(s) or clay mineral(s).

At least one embodiment includes a method of producing a plant treatment product, the method comprising providing a plant treatment component and mixing the plant treatment component with the microbial fermentation product. An illustrative method of producing a plant treatment product comprises combining a substantially liquid microbial fermentation product with a plant treatment component preferably at a ratio between about 1:1 and about 1:100, fermentation product to plant treatment component, or vice versa, to form a plant treatment product. One or more alternative or additional embodiments of producing a plant treatment product comprises combining a substantially dry fermentation product (e.g., the fermentation product bound to a carrier) with a plant treatment component preferably at a ratio between about 1:1 and about 1:100, dry fermentation product to plant treatment component, or vice versa, to form a plant treatment product.

Some embodiments include a method of manufacturing a plant treatment product. The method can include mixing a plant treatment component with a microbial fermentation product to form a plant treatment product (or combination product). In some embodiments, a liquid plant treatment component is mixed with a liquid microbial fermentation product in a tank or mixer prior to product distribution. In one or more additional or alternative embodiments, a liquid plant treatment component and a liquid microbial fermentation product are co-formulated. Additional ingredients can be mixed with the plant treatment component, the microbial fermentation product, or mixture thereof.

In some embodiments, the plant treatment product can comprise a kit or system that includes a plant treatment component and a microbial fermentation product. The kit or system can include instructions for mixing the plant treatment component and the microbial fermentation product for application to one or more plant or crop types. The kit or system can include instructions co-applying the plant treatment component and the microbial fermentation product to one or more plant or crop types.

Additional embodiments include a method of treating and/or enhancing the health of one or more plants or crops. The method can include applying (i.e., administering) or co-applying an effective amount of a plant treatment product (or components thereof) to a plant, preferably so as to improve one or more health indicators of the plant or plant population (e.g., as compared to a control). The one or more health indicators can be selected from the group consisting of wilting, coloration, yield, size and/or weight, life span and/or mortality, overall health and appearance, disease and/or disease effect (e.g., rot), and so forth.

Alternatively, the method can include applying (or co-applying) an effective amount of a plant treatment product (or components thereof) to a seed (e.g., a group of seeds intended for sowing), preferably so as to improve one or more health indicators of the germinating seed and/or later-germinated plant or plant population (e.g., as compared to a control). The one or more health indicators can be selected from the group consisting of stronger germination, wilting, coloration, yield, size and/or weight, life span and/or mortality, overall health and appearance, disease and/or disease effect (e.g., rot), and so forth.

The step of applying (or administering) can comprise spraying and/or distributing a plant treatment product (e.g., comprising, separately or a mixture of, the plant treatment component and microbial fermentation product) on or near the plant, e.g., on the soil, such that the plant uptakes an effective amount of the plant treatment product from the soil. The plant treatment component and microbial fermentation product can also be co-administered or co-applied (e.g., together, as a combination product, or separately). Soil treatment using the disclosed plant treatment product(s) can be performed prior to planting, prior to germination, after germination, and anytime during the life of the plant.

Additional features and advantages of illustrative embodiments of the present disclosure will be set forth in the description which follows, and in part will be obvious from the description, or may be learned by the practice of such illustrative embodiments. The features and advantages of such embodiments may be realized and obtained by means of the instruments and combinations particularly pointed out in the appended claims. These and other features will become more fully apparent from the following description and appended claims, or may be learned by the practice of such illustrative embodiments as set forth hereinafter.

DETAILED DESCRIPTION

Before describing various embodiments of the present disclosure in detail, it is to be understood that this disclosure is not limited to the specific parameters and description of the particularly exemplified systems, methods, and/or products that may vary from one embodiment to the next. It is also to be understood that much, if not all of the terminology used herein is only for the purpose of describing particular embodiments of the present disclosure, and is not necessarily intended to limit the scope of the disclosure in any particular manner. Thus, while certain embodiments of the present disclosure will be described in detail, with reference to specific configurations, parameters, features (e.g., ingredients, components, members, elements, parts, and/or portions), etc., the descriptions are illustrative and are not to be construed as limiting the scope of the present disclosure and/or the claimed invention. In addition, the terminology used herein is for the purpose of describing the embodiments, and is not necessarily intended to limit the scope of the present disclosure and/or the claimed invention.

Unless defined otherwise, all technical and scientific terms used herein have the same meaning as commonly understood by one of ordinary skill in the art to which the present disclosure pertains.

Various aspects of the present disclosure, including systems, methods, and/or products may be illustrated with reference to one or more embodiments, which are exemplary or illustrative in nature. As used herein, the term "embodiment" means "serving as an example, instance, or illustration," and should not necessarily be construed as preferred or advantageous over other aspects disclosed herein. In addition, reference to an embodiment is intended to provide an illustrative example without limiting the scope of the invention, which is indicated by the appended claims rather than by the description thereof. The terms "exemplary," "illustrative," and so forth can be used interchangeably and/or to make reference to one or more embodiments.

As used throughout this disclosure, the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used in this specification and the appended claims, the singular forms "a," "an" and "the" each contemplate, include, and specifically disclose both the singular and plural referents, unless the context clearly dictates otherwise. For example, reference to a "carrier" contemplates and specifically discloses one, as well as two or more nucleic acids. Similarly, use of a plural referent does not necessarily require a plurality of such referents, but contemplates, includes, and specifically discloses one, as well as two or more of such referents, unless the context clearly dictates otherwise.

For the sake of brevity, the present disclosure may recite a list or range of numerical values. It will also be appreciated that where two or more values, or a range of values (e.g., less than, greater than, at least, and/or up to a certain value, and/or between two recited values) is disclosed or recited, any specific value or range of values falling within the disclosed values or range of values is likewise specifically disclosed and contemplated herein. Thus, disclosure of an illustrative measurement (e.g., length, width, thickness, etc.) that is less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

As used herein, "products" include compositions, formulations, mixtures, kits, systems, and so forth. Similarly, "methods" include processes, procedures, steps, and so forth.

As used herein, the term "about" or "approximately," with regard to a value, generally means or implies +/−10% of the stated value or amount represented thereby. Moreover, throughout the present disclosure, the term "about" is used in connection with a percent concentration or composition of a component or ingredient. In such instance, the term "about" or "approximately" and/or the term "+/−10%" implies and/or includes +/−10% of the stated numeric value, as opposed to +/−10 percentage points of the recited percent. By way of example, where 20% w/w of a component or ingredient reflects 20 g of the component or ingredient per 100 mL of total mixture, the term "about" and/or the term "+/−10%" implies and/or includes a recited range from 18 g to 22 g (i.e., from 18% w/w to 22% w/w), not a range of 10% w/w to 30% w/w. Alternatives for so-called "about" values and/or +/−10% include +/−1%, +/−2%, +/−3%, +/−4%, +/−5%, +/−6%, +/−7%, +/−8%, or +/−9% of the stated value, each of which is contemplated as a suitable alternative to or substitute for the term "about" or the use of +/−10% herein.

As used herein, the term "substantially" represents or implys an (or any) amount close to the stated amount (e.g., that still performs a desired function or achieves a (desired, intended, or expected) result). For example, the term "substantially" may refer to an amount that is within, or less than, 10%, 5%, 1%, 0.1%, 0.01%, or other percent of a stated amount. As used herein, the term "substantially devoid" means (1) an undetectable or unquantifiable amount, (2) less than or below an amount generally considered by those skilled in the art to reflect a detectable or quantifiable amount, and/or (3) less than or below an amount generally considered by those skilled in the art to be functional or able to achieve a (desired, intended, or expected) result (e.g., less than 10%, 5%, 1%, 0.1%, 0.01%, or other percent).

Percent concentrations or compositions, as presented herein, represent values measured as a w/w percent, w/v percent, or v/v percent.

As understood by those skilled in the art, a "hectare" (abbreviated "ha") is a metric system unit of area, primarily used in the measurement of land, and is equal to 100 ares (10,000 $m^2$) or 1 square hectometre ($hm^2$). An acre is about 0.405 hectare and one hectare contains about 2.47 acres.

Various aspects or embodiments of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical, physical, and/or chemical association.

In addition, various aspects or embodiments of the present disclosure can be illustrated by describing components that are mixed together. As used herein, "mixed," "mixing," and similar terms indicate a physical combining or combination of two or more components. In some embodiments, the physical combining or combination results in a (chemical and/or physical) reaction. Such chemical reactions can be evidenced by a change in the chemical composition, pH, or other indicator relative to the components prior to being mixed (or as expected after being mixed absent the reaction). Thus, mixing and/or mixed components can include reacting and/or reacted components in certain embodiments. Accordingly, reference to mixing or mixed components includes a reference to reacting or reacted components.

The term "co-application" and similar terms refer to concurrent, sequential, and/or combined application of two or more components. For instance, two components can be co-applied by applying each component in a separate application concurrently, simultaneously, or sequentially (e.g., distinct applications separated by a period of time). The period of time can be very small (e.g., substantially, immediately following a first application) or longer (e.g., 1-60 seconds, 1-60 minutes, 1-24 hours, 1-7 days, 1-4 weeks, 1-12 months, and so forth, or any value or range of values therebetween). Concurrent or simultaneous applications can include overlapping application timeframes for the two or more components or application of a combination product comprising a mixture of the two or more components.

The term "comprising" is synonymous with "including," "having," "containing," or "characterized by." These terms are inclusive and open-ended and do not exclude additional, unrecited elements or method steps. The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole. The phrase "consisting essentially of" limits the scope of a claim to the specified materials or steps, plus those that do not materially affect the basic and novel characteristic(s) of the claimed subject matter. The terms "comprising", "consisting of", and "consisting essentially of" can be alternatively used. When one of these three terms is used, the presently disclosed and claimed subject matter can include the use of either of the other two terms.

The terms "plurality" and "at least two" are used interchangeably.

Specific language will be used herein to describe the illustrative embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

While the detailed description is separated into sections, the section headers and contents within each section are for organizational purposes only and are not intended to be self-contained descriptions and embodiments or to limit the scope of the description or the claims. Rather, the contents of each section within the detailed description are intended to be read and understood as a collective whole, where elements of one section may pertain to and/or inform other sections. Accordingly, embodiments specifically disclosed within one section may also relate to and/or serve as additional and/or alternative embodiments in another section having the same and/or similar products, methods, and/or terminology.

Embodiments of the present disclosure include plant treatment (e.g., crop protection) products (e.g. compositions, systems, kits, etc.) and methods (e.g. processes, steps, etc.) for making and using the same. In particular, embodiments of the present disclosure relate to a plant treatment product that includes a plant treatment component mixed with a microbial fermentation product, and to methods of manufacturing and/or using the same (e.g., to enhance the health of crops). In some embodiments, the plant treatment component can be or comprise a pesticide or a PGR. In some embodiments, the microbial fermentation product can be in liquid (e.g., suspension) or in substantially dry (e.g., bound to a carrier) form. In some embodiments, the plant treatment product can include one or more additional ingredients.

Some embodiments include a method of manufacturing a plant treatment product. The method can include mixing a plant treatment component with a microbial fermentation product. Additional embodiments include a method of enhancing the health of a plant. The method can include administering or applying an effective amount of plant treatment product to the plant so as to improve one or more health indicators of the plant or plant population (e.g., as compared to a control). Each of the foregoing and other embodiments, including specific components, characteristics, and/or features thereof, will now be discussed in further detail.

Illustrative Fermentation Products

As used herein, a (microbial, bacterial, yeast, fungal, etc.) "fermentation product" or similar term refers to a resultant of at least a period of anaerobic metabolism or cellular respiration (e.g., by one or more microorganisms), as understood by those skilled in the art, and not merely bulk or other growth (e.g., of such microorganism(s) on or in a growth medium). In some embodiment, the fermentation product can also result from (one or more periods of) aerobic metabolism. The fermentation product can comprise a condensed and/or extracted fermentation product, a presscake, fermentation solubles, a fermentation extract, dried fermentation solubles, liquid fermentation product, dried fermentation biomass, or a combination thereof. As used herein, a "liquid fermentation product" or similar term refers to a fermentation product in liquid form. For instance, the liquid fermentation product can be or comprise components of a liquid fermentation culture (e.g., a whole or complete microbial fermentation suspension culture), including a (at least partially spent or post-fermentation) liquid culture medium or component(s) thereof, one or more microorganisms and/or cellular material (e.g., structural components) thereof, one or more (fermentation, anaerobic, aerobic, to and/or other) metabolites (produced by the microorganisms, and other components as known in the art.

The microbial fermentation product can be processed (e.g., purified, filtered, isolated, separated, etc.) or crude (e.g., unprocessed). In some embodiments, the fermentation product can comprise the substantially unpurified resultant of microbial anaerobic (and optionally aerobic) metabolism, including one or more (fermentation) metabolites, a (liquid) fermentation medium (e.g., remaining after a fermentation process), and/or microbial cellular and/or structural components (e.g., whole cell lysate).

In at least one embodiment, the fermentation product includes one or more microorganisms and/or cellular material, such as cellular structural components, organelles, genetic material, macromolecules, or other component thereof. As used herein, the terms "microorganism," "microbial organism," "microbe," and the like refer to a species or strain of bacteria, archaea, certain protozoa, fungi, such as yeast, mold, etc., and algae, whether single-celled or multicellular organism, whether prokaryotic or eukaryotic, as understood by those skilled in the art. In some embodiments, the fermentation product includes (whole-cell) lysed microorganisms. The one or more microorganisms may include any number of microorganism species or strains, including, without limitation, one, two, three, four, five, six, seven, eight, nine, ten, or any other number of discrete (e.g., separately identifiable) microorganism strains or species.

Illustrative bacteria can include, without limitation: a species or strain of *Acetobacter*, including species *aceti, xylinum*, suboxydans, and so forth; a species or strain of *Bacillus*, including species apiaries, *azotofixans, brevis, cereus, circulans, coagulans, laterosporus, lentus, licheniformis, macerans, marinus, megaterium, pasteurii, polymyxa, pulvifaciens, pumilus, schlegelii, sphaericus, stearothermophilus, subtilis, thiaminolyticus, thuringiensis, tusciae*, and so forth; a species or strain of *Bacteroides*, including species *amylophilus, copillosus, ruminocola, suis*, and so forth; a species or strain of *Bifidobacterium*, including species *adolescentis, animalis, bifidum, infantis, longum, thermophilum*, and so forth; a species or strain of *Enterococcus*, including species *cremoris, diacetylactis, faecium, intermedius, lactis, thermophilus*, and so forth; a species or strain of *Lactobacillus*, including species *acidophilus, brevis, buchneri, bulgaricus, casei, cellobiosus, curvatus, delbruekii, farciminis, fermentum, helveticus, lactis, plantarum, reuteri*, and so forth; a species or strain of *Leuconostoc*, including species *citovorum, dextranicum, mesenteroides*, and so forth; a species or strain of Megasphaera, including species elsdenii, and so forth; a species or strain of *Pediococcus*, including species *acidilactici, cerevisiae (damnosus), pentosaceus*, and so forth; a species or strain of *Propionibacterium*, including species *freudenreichii, shermanii*, and so forth; a species or strain of *Rhodopseudomonas*, including species *palustris*, and so forth; and/or a species or strain of *Streptococcus*, including species *cremoirs, diacetilactis, faecium, intermedius, lactis, salivarius, thermophilus*, and so forth. Other embodiments include, for example, a species or strain of *Streptomyces*, including species *natalensis, chattanoogensis, griseus*, and so forth; a species or strain of *Xanthomonas*, including species *campestris*, and so forth; a species or strain of *Rhizopus*, including species *niveus*, and so forth; a species or strain of *Micrococcus*, including species *lysodeikticus*, and so forth; a species or strain of *Bacillus*, including species *cereus*, and so forth; and/or a species or strain of *Leuconostoc*, including species citovorum, dextranicum, and so forth.

In at least one embodiment, the fermentation product can include a first species and/or strain of *Lactobacillus* (e.g., *acidophilus*) and/or cellular or structural components thereof (e.g., lysed *Lactobacillus* sp.). In some embodiments, the fermentation product can include one or more additional microbial (e.g., bacterial, fungal, yeast, mold, algae) species or strains (such as one or more of those listed herein) and/or cellular or structural components thereof. For instance, the fermentation product can include one or more additional lysed bacterial species or strains, other than the first species or strain of *Lactobacillus*.

In some embodiments, the one or more microorganisms or additional microorganisms do not include a bacteria or bacterial species or strain. In some embodiments, the plant treatment product or microbial fermentation product thereof can be substantially devoid of bacteria and/or cellular or structural components thereof. For instance, in some embodiments, the fermentation product can be a fungal (e.g., yeast and/or mold) fermentation product that is substantially devoid of bacteria and/or cellular or structural components thereof. Illustrative fungi can include, without limitation, yeast of phyla *Ascomycota*, such as *Saccharomycotina* and/or *Taphrinomycotina* (e.g., *Schizosaccharomycetes*), and/or phyla Basidiomycota, such as *Agaricomycotina* (e.g., *Tremellomycetes*) and/or *Pucciniomycotina* (e.g., *Microbotryomycetes*). Illustrative yeast can include a species or strain of *Candida* (previously known as *Torulopsis*) including species *utilis, glabrata, guilliermondii, lipolytica, pseudotropicalis*, and so forth; a species or strain of *Kluyveromyces* including species *lactis*, and so forth; and/or a species or strain of *Saccharomyces*, including species *cerevisiae, boulardii, fragilis*, and so forth. Illustrative fungi can further include a species or strain of *Aspergillus*, including species *niger*, orizae (or *oryzae*), and so forth; a species or strain of *Penicillium* including specise *roquefortii*, and so forth; a species or strain of *Mucor*, including species *miehei, pusillus*, and so forth; a species or strain of *Morteirella*, including species *vinaceae*, and so forth; a species or strain of *Endothia*, including species *parasitica*, and so forth; and/or a species or strain of *Rhizomucor*, including species *miehei*, and so forth.

In some embodiments, the plant treatment product or microbial fermentation product thereof can be substantially devoid of fungi, yeast, mold, and/or cellular or structural components of any one or more of the foregoing. For instance, in some embodiments, the fermentation product can be a bacterial fermentation product that is substantially devoid of fungi, yeast, mold, and/or cellular or structural components of any one or more of the foregoing. Some embodiments can be substantially devoid of mold and/or cellular or structural components thereof. In some embodiments, the fermentation product can be a bacterial and/or yeast fermentation product that is substantially devoid of mold and/or cellular or structural components thereof. Some embodiments can be substantially devoid of algae and/or cellular or structural components thereof. Certain embodiments can include at least one bacterial species or strain, at least one fungal (or yeast, or mold) species or strain, and/or at least one algae species or strain.

In at least one embodiment, the one or more microorganisms of the fermentation product can be in a spore form, a vegetative form, a metabolic form, or a combination thereof. In some embodiments, however, the one or more microorganisms of the fermentation product can be non-living, non-viable, non-metabolic, and/or lysed. Accordingly, the fermentation product can comprise one or more non-living, non-viable, non-metabolic, and/or lysed microorganism, or cellular material (e.g., cell structural components) thereof. In addition, the fermentation product can be substantially devoid of one or more or any living (e.g., metabolic, dormant, sporulated, etc.) microorganisms. For instance, the fermentation product can comprise or be comprised of less than about 50%, less than about 40%, less than about 30%, less than about 25%, less than about 20%, less than about 15%, less than about 10%, less than about 5%, less than about 1%, less than about 0.5%, less than about 0.25%, less than about 0.1%, less than about 0.05%, less than about 0.01%, or less living or viable microorganisms. Accordingly, whereas probiotic products or direct-fed microorganism (DFM)-containing products may comprise live cultures, a source of live or viable, naturally occurring microorganisms, etc., some embodiments of the present disclosure can include a microbial fermentation product that is substantially or entirely devoid of live or viable microorganisms (of one or more varieties). In particular, the microorganisms can be intentionally killed and/or inactivated (e.g., by lysing, such as by sonication, vigorous mixing or blending, heat inactivation, pH inactivation, and so forth), as known in the art.

As indicated above, the fermentation product can also include a liquid (fermentation) medium (e.g., remaining after a fermentation process). Accordingly, the fermentation product can comprise a resultant of microbial liquid suspension (fermentation) culture grown in anaerobic (and optionally aerobic) conditions. The medium can include a liquid base component, such as water or a nutrient broth (e.g., Lysogeny Broth (LB), M9, fluid thioglycollate medium (FTM), NZ, NZY, or NZYM broths, SOB, SuperBroth, 2X YT, MOPS, SOC, TB, and so forth). The medium can also include one or more nutrient, growth, and/or other components (e.g., remaining after the fermentation process), such as a carbon source (e.g., carbohydrate, such as glucose, sucrose, fructose, lactose, galactose, etc.), (inorganic) nitrogen source, protein or amino acid source (e.g., synthetic proteins or amino acids, natural, plant- and/or animal-derived proteins or amino acids, etc.), vitamin (e.g., thiamine, riboflavin, folic acid, pantothenic acid, niacin, Vitamin $B_{12}$, Vitamin E, pyridoxine, Vitamin D, Vitamin K, Vitamin A, choline, etc.), mineral, trace element (e.g. copper, iron, manganese, zinc, molybdenum, chromium, selenium, etc.), essential element (e.g., magnesium, nitrogen, phosphorus, sulfur), salt (e.g., potassium phosphate, sodium phosphate, sodium chloride, ammonium chloride, magnesium sulfate, calcium chloride, etc.), yeast extract, enzyme, and/or any other suitable (fermentation) culture component, as known to those skilled in the art. In addition, certain fermentation products can specifically exclude one or more of the foregoing or other known culture components (e.g., serum, growth factor, hormone, enzyme, antibiotic, beef extract, whole blood, heat-treated blood, etc.)

The fermentation product can include one or more metabolites. In at least one embodiment, the one or more metabolites comprise fermentation or other metabolites produced by the microorganisms (e.g., during anaerobic and optionally aerobic metabolism). Microbial fermentation metabolites can include, without limitation, one or more organic acids (e.g., lactic acid, acetic acid, formic acid, and so forth) amino acids, carbohydrates, fats, fatty-acids, enzymes, vitamins, and/or any other microbial metabolite component, as known to those skilled in the art. The metabolite(s) can be nutritionally beneficial to one or more plants or crops, or microorganisms associated therewith. In some embodiments, the metabolite(s) can comprise one or more microorganism waste products. In at least one embodiment, the fermentation product can be substantially devoid of antimicrobials (e.g., bacteriocins, antibiotics, hydrogen peroxide, and so forth); certain enzymes (e.g., proteases, amylases, lipases, glycosidases, DNA and/or RNA polymerases), and so forth.

In some embodiments, the metabolites can be at least partially purified (e.g., away from undesirable matter, such as waste products, fermentation medium, microbial cellular and/or structural material, etc.). Alternatively, the metabolites can be substantially unpurified in one or more embodiments. The substantially unpurified metabolites can be disposed in the microbial organisms and/or the (liquid) fermentation medium (e.g., outside of the microbial organisms). In some embodiments, the microorganisms can be lysed (e.g., such that substantially all of the metabolites are free in solution (i.e., not contained within the microorganisms)). Accordingly, in some embodiments, the fermentation product can comprise a mixture (e.g., solution, colloid, suspension, colloidal suspension, emulsion, etc.) of post-fermentation liquid medium, one or more microbial fermentation metabolites (e.g., anaerobic and/or aerobic metabolic products), and microbial cellular and/or structural components (e.g., whole cell lysate). In at least one embodiment, the mixture can be crude, raw, and/or substantially unpurified.

Illustrative fermentation methods, parameters, etc. include those known to those skilled in the art. The fermentation product can be prepared by one or more fermentation processes, including growing of one or more microbial (e.g., bacterial) species or strains or cell lines on a solid growth medium, as known in the art. The microbial culture can be grown in natural and/or ambient conditions in some embodiments. In other embodiments, the culture can be grown in artificial and/or optimized conditions. The microbial cultures can be grown at a biologically-suitable temperature (e.g., between about 20-50 degrees Celsius (° C.) or between about 30-40° C.), acidity (pH) (e.g., about 3.0-8.0), etc. Moreover, the growth medium can include one or more of the above-described or other medium components, including, without limitation, a (substantially solid) base component (e.g., agar or other suitable base component), nutrient, and/or other components (e.g., carbon and/or (inorganic) nitrogen source, vitamin, mineral, trace element, essential element, amino acid, amino acid source, salt, yeast extract, and/or any other culture component, as known to those skilled in the art. In at least one embodiment, the microbial culture can be grown in aerobic and/or anaerobic conditions.

In some embodiments, the fermentation process can also include inoculating one or more (of the) viable microorganisms or microbial lines (or colonies thereof) into a liquid growth medium (e.g., to form a starter suspension culture), as known in the art. Liquid (suspension) cultures can also be grown in natural and/or ambient or artificial and/or optimized conditions, as described above. The liquid growth medium can include one or more of the above-described or other medium components.

In at least one embodiment, the viable starter culture (or a suitable portion thereof, including a whole fraction, extract, cell pellet, etc. thereof) can be transferred into liquid fermentation medium (e.g., to form a liquid fermentation culture). The liquid fermentation medium and/or culture can be disposed in a bioreactor, flask, or other suitable growth container. Moreover, the liquid fermentation medium and/or culture can include one or more of the above-described or other medium components. Similarly, the liquid fermentation culture can also be grown in natural and/or ambient or artificial and/or optimized conditions, as described above. In at least one alternative embodiment, the one or more viable microorganisms or microbial lines (or colonies thereof) can be inoculated directly into a liquid fermentation medium.

The fermentation culture can be grown under anaerobic and/or aerobic conditions for a first period of time and/or under first fermentation conditions, as known in the art and described herein. For instance, the fermentation culture can be grown for between about 0.5 days and about 5 days, at a temperature between about 10-50° C., and/or at a pH between about 2-10. After the first period of time, the fermentation culture can be grown under anaerobic and/or aerobic conditions for a second period of time and/or under second fermentation conditions, as known in the art and described herein. For instance, the second period of time can be between 0.5 days and about 5 days. The second fermentation conditions can include a temperature between about 10-50° C., a pH between about 2 and about 10, etc. In some embodiments, the second period of time and/or second fermentation conditions can be different than the first period of time and/or first fermentation conditions. For instance, the fermentation culture (or suitable portion thereof) can be transferred into the second fermentation conditions and/or a second fermentation medium. The second fermentation medium can be disposed in a bioreactor, flask, or other suitable growth container and/or can include one or more of the above-described or other medium components.

It will be appreciated that the fermentation process can also include additional period(s) of time, fermentation condition(s), fermentation media, etc., as known in the art and described herein. At the completion of the fermentation process, the fermentation culture can be or comprise a microbial fermentation product and/or can be optionally and/or additionally processed to form a microbial fermentation product. For instance, in certain embodiments, the (anaerobically and/or aerobically metabolic) microorganisms of the fermentation culture can be intentionally killed and/or inactivated (e.g., by lysing, such as by sonication, vigorous mixing, or blending, heat inactivation, pH inactivation or killing, and so forth), as known in the art. In at least some embodiments, fermentation metabolites disposed within the microbial cells or organisms of the fermentation culture can thereby be released into the medium (e.g., such that the metabolites are free in solution or other liquid medium type). The non-living, non-viable, non-metabolic, and/or lysed microorganism, or cellular material (cell structural components) thereof, can be retained in the liquid fermentation medium or at least partially (e.g., substantially and/or completely) removed therefrom (e.g., via (ultra) centrifugation, filtration, etc.). In certain embodiments, the fermentation product comprises a whole-cell and/or whole-culture lysate of the fermentation culture (e.g., without substantial removal, purification, isolation, etc. of one or more (e.g., any) component(s) of the fermentation culture). In alternative embodiments, however, one or more components of the fermentation culture can be at least partially and/or substantially removed, purified, isolated, etc.

Accordingly, the fermentation product can be in a substantially liquid (suspension, solution, colloid, gel, slurry, etc.) form and/or can include one or more components of a microbial fermentation culture (e.g., prepared as described herein and/or as known in the art). In at least one illustrative embodiment, the fermentation product can comprise a liquid suspension comprising the substantially unpurified resultant of microbial anaerobic and optionally aerobic metabolism, including (i) substantially all of the (fermentation) metabolites produced by the fermentation culture, (ii) the liquid fermentation medium in which the fermentation culture was grown (e.g., remaining after a fermentation process), and (iii) a whole-cell lysate the microorganisms or culture, including all of the microbial cellular and/or structural components of the microorganisms grown in the fermentation culture. Alternatively, the fermentation product can be in substantially solid form (e.g., dried, freeze-dried, vacuum-dried, heat-dried, dehydrated, extracted, etc.), comprising one or more of the foregoing components of the fermentation culture.

Illustrative Carriers

As used herein, "carrier," "excipient," and similar terms refer to a component adapted for conveying a substance. For instance, a carrier component can comprise a solid, dry, and/or substantially dry carrier. In at least one embodiment, the carrier can comprise an organic and/or earthen carrier, comprising one or more organic and/or earth components or materials. Earthen carriers, components, and/or materials can include, for example, phyllosilicate(s) (e.g., of potassium (K), sodium (Na), calcium (Ca), and/or aluminum (Al)). The phyllosilicate can be of the chlorite, clay, mica, or serpentine variety. In at least one embodiment, the carrier can comprise one or more 1:1 or 2:1 clay mineral phyllosilicates.

Illustrative carriers can comprise, without limitation, aliettite, attapulgite, beidellite, bentonite, biotite, calcium silicate, calcium stearate, chlorite (e.g., clinochlore, chamosite, nimite, pennantite, and/or zinc, lithium, and/or calcium species thereof), cookeite, diatomite and/or other diatomaceous earth products, dickite, glauconite, halloysite, hectorite, hydrophobic silica, illite, kaolin, kaolinite, montmorillonite, muscovite, nacrite, nontronite, palygorskite, phyllite, saponite, sauconite, sepiolite, sericite, serpentine, smectite, talc, tonstein, and vermiculite. Certain carriers can be or comprise a naturally-occurring material or component. Other carriers can be or comprise an artificial and/or synthesized material or component. Carriers can also include (dried) plant materials and/or extracts, meal, flour, protein powders, seaweed, and so forth.

In some embodiments, the carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. As used herein, the term "substantially dry carrier" refers to a carrier having one or more of the foregoing moisture contents. Such substantially dry carriers can be understood generally to be solid, dry substances, while still having at least some moisture associated therewith.

In some embodiments, the carrier can be in powdered, granular, and/or particulate form or have an average particle size between about 20-297 microns (e.g., corresponding to approximately 625-50 mesh). In at least one preferred embodiment, the carrier can have an average particle size of about 74 micron (or about 200 mesh) +/−20%, 15%, 10%, 8%, or 5%. In certain embodiments, the solid carrier can be sized (e.g., by milling, crushing, grinding, etc.) to a suitable average particle size. Accordingly, in some embodiments, the solid carrier can be a mined and milled earth component having a suitable average particle size.

In at least one embodiment, the fermentation product can be bound to the carrier to form a fermentation product-bound carrier. For instance, the fermentation product can be physically and/or chemically bound to the carrier (e.g., by chemical reaction or means). In some embodiments, the fermentation product can be bound to the carrier by static electricity or by a force other than (general or macro) static electricity. In certain embodiments, binding of the fermentation to the carrier can increase bioavailability of at least one of the metabolites (e.g., relative to being free in solution or extracted, purified, and/or isolated from solution or cell). Accordingly, the fermentation product can be applied to the carrier, bound to the outer surface of the carrier, and/or bound to a portion of the carrier adjacent to or below the surface. For instance, in some embodiments, at least a portion of the liquid fermentation product can be (i) adsorbed to the surface of the carrier and/or (ii) absorbed below the surface of the carrier. The liquid fermentation product can also be bound to the carrier by drying thereon and/or therein after being applied thereto. Thus, in certain embodiments, the liquid fermentation product can be at least partially dry-bound to the carrier. As used herein, "dry-bound," and similar terms refers to the persistent and/or sustained physical association of two or more substances by physical and/or chemical forces established during a drying process.

In at least one embodiment, the fermentation product can substantially or at least partially coat the carrier. For instance, the fermentation product can be applied to the carrier (e.g., such that the liquid portion of the fermentation product does not dissolve the carrier and/or such that the applied portion of the fermentation product substantially or at least partially coat surrounds the carrier). In some embodiments, at least a portion of the fermentation product can be chemically bound to the carrier. For instance, the fermentation product can be reacted with the carrier (e.g., such that a physical and/or chemical binding reaction occurs). The reaction can be endothermic or exothermic. In addition, the reaction can be facilitated and/or accelerated by one or more enzymes or other reaction components or parameters (e.g., heat, air (flow), mixing, etc.). The enzyme or other component can be a metabolic reaction product, a fermentation culture component, and/or a separate component added prior to or during application of the fermentation product to the carrier.

In some embodiments, the fermentation product-bound carrier can be in a solid form. For instance, the fermentation product-bound carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the fermentation product-bound carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. Accordingly, the fermentation product-bound carrier can be substantially dry. In other embodiments, the fermentation product-bound carrier can be in a substantially liquid (suspension, solution, colloid, gel, slurry, etc.) form.

In one or more embodiments, the fermentation product can be bound to the carrier such that the fermentation product and/or one or more components thereof is maintained at a suitable pH or pH range, or in an environment having a suitable pH or pH range. For instance, in some embodiments, the carrier and/or the fermentation product-bound carrier can provide and/or have a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5.

The carrier component can also or alternatively comprise a liquid or liquid composition (e.g., solution, suspension, colloid, mixture, etc.). Illustrative liquid carriers include, without limitation, water or other aqueous liquid, an oil, or any suitable liquid composition or carrier, such as a solvent (of a solution), a continuous phase (of a colloid), an external phase (of a suspension), etc. In some embodiments, the (liquid) carrier can be or comprise a medium, such as a suspension culture medium. In at least one embodiment, the fermentation product can be mixed with the carrier to form a diluted or mixable fermentation product.

Illustrative Plant Treatment Components

Illustrative plant treatment components include one or more of the following: (1) a pesticide, preferably selected from the group consisting of (i) an insecticide (e.g., against Lepidopterans, Hemipterans, Dipterans, Coleopteras, etc.), (ii) a non-insecticide pesticide (e.g., against rodents, amphibians, etc.), (iii) an antimicrobial pesticide (e.g., fungicide, bactericide, antibiotic, antiparasitic, antiviral, etc.), (iv) an herbicide (e.g., selective or non-selective), and (v) a nematicide; and (2) a PGR. In certain embodiments, the plant treatment component can include a fertilizer. In a preferred embodiment, the plant treatment product, or plant treatment component thereof, can be (substantially or entirely) devoid of one or more fertilizers (e.g., urea and/or nitrogen-containing fertilizers). The plant treatment product and/or plant treatment component thereof can be in a (substantially) dry, solid or liquid state.

Illustrative Insecticides

In some embodiments, the pesticide can be or comprise a (chemical) insecticide. A wide variety of (chemical) insecticides are commercially available and known to those skilled in the art, each of which is contemplated herein. Illustrative (chemical) insecticides include sodium channel modulators and voltage-dependent sodium channel blockers. In at least one embodiment the sodium channel modulator and/or voltage-dependent sodium channel blocker is selected from the group consisting of: prethroids, DDT (I139), Methoxychlor (I140), Indoxacarb (I219), Metaflumizone (I220), and combinations thereof. In an embodiment, the sodium channel modulator and/or voltage-dependent sodium channel blocker is selected from the group consisting of: Acrinathrin (I96), Allethrin (I97), d-cis-trans Allethrin (I98), d-trans Allethrin (I99), Bifenthrin (I100), Bioallethrin (I101), Bioallethrin S-cyclopentenyl isomer (I102), Bioresmethrin (I103), Cycloprothrin (I104), Cyfluthrin (I105), beta-Cyfluthrin (I106), Cyhalothrin (I107), lambda-Cyhalothrin (I108), gamma-Cyhalothrin (I109), Cypermethrin (I110), alpha-Cypermethrin (I111), beta-Cypermethrin (I112), theta-Cypermethrin (I113), zeta-Cypermethrin (I114), Cyphenothrin [(1R)-trans isomers](I115), Deltamethrin (I116), Empenthrin [(EZ)-(1R) isomers) (I117), Esfenvalerate (I118), Etofenprox (I119), Fenpropathrin (I120), Fenvalerate (I121), Flucythrinate (I122), Flumethrin (I123), tau-Fluvalinate (I124), Halfenprox (I125), Imiprothrin (I126), Kadethrin (I127), Permethrin (I128), Phenothrin [(1R)-trans isomer) (I129), Prallethrin (I130), Pyrethrine (pyrethrum) (I131), Resmethrin (I132), Silafluofen (I133), Tefluthrin (I134), Tetramethrin (I135), Tetramethrin [(1R) isomers)](I136), Tralomethrin (I137), Transfluthrin (I138), DDT (I139), Methoxychlor (I140), Indoxacarb (I219), Metaflumizone (I220), and combinations thereof.

According to at least one embodiment of the present disclosure the at least one insecticide is selected from the group consisting of: Acrinathrin (I96), Alpha-Cypermethrin (I111), Beta-Cyfluthrin (I106), Bifenthrin (I100), Cyfluthrin (I105), Cypermethrin (I110), Deltamethrin (I116), Gamma-Cyhalothrin (I109), Lambda-Cyhalothrin (I108), Tefluthrin (I134), Indoxacarb (I219), and Metaflumizone (I220). In some embodiments, the at least one insecticide is selected from the group consisting of: Beta-Cyfluthrin (I106), Deltamethrin (I116), Tefluthrin (I134), and combinations thereof. In some embodiments, the at least one insecticide is selected from the group consisting of: (1) Acetylcholinesterase (AChE) inhibitors, for example carbamates, e.g. Alanycarb (I1), Aldicarb (I2), Bendiocarb (I3), Benfuracarb (I4), Butocarboxim (I5), Butoxycarboxim (I6), Carbaryl (I7), Carbofuran (I8), Carbosulfan (I9), Ethiofencarb (I10), Fenobucarb (I11), Formetanate (I12), Furathiocarb (I13), Isoprocarb (I14), Methiocarb (I15), Methomyl (I16), Metolcarb (I17), Oxamyl (I18), Pirimicarb (I19), Propoxur (I20), Thiodicarb (I21), Thiofanox (I22), Triazamate (I23), Trimethacarb (I24), XMC (I25), and Xylylcarb (I26); or organophosphates, e.g. Acephate (I27), Azamethiphos (I28), Azinphos-ethyl (I29), Azinphos-methyl (I30), Cadusafos (I31), Chlorethoxyfos (I32), Chlorfenvinphos (I33), Chlormephos (I34), Chlorpyrifos (I35), Chlorpyrifos-methyl (I36), Coumaphos (I37), Cyanophos (I38), Demeton-S-methyl (I39), Diazinon (I40), Dichlorvos/DDVP (I41), Dicrotophos (I42), Dimethoate (I43), Dimethylvinphos (I44), Disulfoton (I45), EPN (I46), Ethion (I47), Ethoprophos (I48), Famphur (I49), Fenamiphos (I50), Fenitrothion (I51), Fenthion (I52), Fosthiazate (I53), Heptenophos (I54), Imicyafos (I55), Isofenphos (I56), Isopropyl O-(methoxyaminothio-phosphoryl) salicylate (I57), Isoxathion (I58), Malathion (I59), Mecarbam (I60), Methamidophos (I61), Methidathion (I62), Mevinphos (I63), Monocrotophos (I64), Naled (I65), Omethoate (I66), Oxydemeton-methyl (I67), Parathion (I68), Parathion-methyl (I69), Phenthoate (I70), Phorate (I71), Phosalone (I72), Phosmet (I73), Phosphamidon (I74), Phoxim (I75), Pirimiphos-methyl (I76), Profenofos (I77), Propetamphos (I78), Prothiofos (I79), Pyraclofos (I80), Pyridaphenthion (I81), Quinalphos (I82), Sulfotep (I83), Tebupirimfos (I84), Temephos (I85), Terbufos (I86), Tetrachlorvinphos (I87), Thiometon (I88), Triazophos (I89), Trichlorfon (I90), and Vamidothion (I91); (2) GABA-gated chloride channel antagonists, for example cyclodiene organochlorines, e.g. Chlordane (I92) and Endosulfan (I93); or phenylpyrazoles (fiproles), e.g. Ethiprole (I94) and Fipronil (I95); (3) Sodium channel modulators/voltage-dependent sodium channel blockers, for example pyrethroids, e.g. Acrinathrin (I96), Allethrin (I97), d-cis-trans Allethrin (I98), d-trans Allethrin (I99), Bifenthrin (I100), Bioallethrin (I101), Bioallethrin S-cyclopentenyl isomer (I102), Bioresmethrin (I103), Cycloprothrin (I104), Cyfluthrin (I105), beta-Cyfluthrin (I106), Cyhalothrin (I107), lambda-Cyhalothrin (I108), gamma-Cyhalothrin (I109), Cypermethrin (I110), alpha-Cypermethrin (I111), beta-Cypermethrin (I112), theta-Cypermethrin (I113), zeta-Cypermethrin (I114), Cyphenothrin [(1R)-trans isomers](I115), Deltamethrin (I116), Empenthrin [(EZ)-(1R) isomers) (I117), Esfenvalerate (I118), Etofenprox (I119), Fenpropathrin (I120), Fenvalerate (I121), Flucythrinate (I122), Flumethrin (I123), tau-Fluvalinate (I124), Halfenprox (I125), lmiprothrin (I126), Kadethrin (I127), Permethrin (I128), Phenothrin [(1R)-trans isomer) (I129), Prallethrin (I130), Pyrethrine (pyrethrum) (I131), Resmethrin (I132), Silafluofen (I133), Tefluthrin (I134), Tetramethrin (I135), Tetramethrin [(1R) isomers)] (I136), Tralomethrin (I137), and Transfluthrin (I138); or DDT (I139); or Methoxychlor (I140); (4) Nicotinic acetylcholine receptor (nAChR) agonists, for example neonicotinoids, e.g. Acetamiprid (I141), Clothianidin (I142), Dinotefuran (I143), Imidacloprid (I144), Nitenpyram (I145), Thiacloprid (I146), and Thiamethoxam (I147); or Nicotine (I148); or Sulfoxaflor (I149). (5) Nicotinic acetylcholine receptor (nAChR) allosteric activators, for example spinosyns, e.g. Spinetoram (I150) and Spinosad (I151), (6) Chloride channel activators, for example avermectins/milbemycins, e.g. Abamectin (I152), Emamectin benzoate (I153), Lepimectin (I154), and Milbemectin (I155), (7) Juvenile hormone mimics, for example juvenile hormone analogues, e.g. Hydroprene (I156), Kinoprene (I157), and Methoprene (I158); or Fenoxycarb (I159); or Pyriproxyfen (I160); (8) Miscellaneous non-specific (multi-site) inhibitors, for example alkyl halides, e.g. Methyl bromide (I161) and other alkyl halides; or Chloropicrin (I162); or Sulfuryl fluoride (I163); or Borax (I164); or Tartar emetic (I165); (9) Selective homopteran feeding blockers, e.g. Pymetrozine (I166); or Flonicamid (I167); (10) Mite growth inhibitors, e.g. Clofentezine (I168), Hexythiazox (I169), and Diflovidazin (I170); or Etoxazole (I171); (11) Microbial disruptors of insect midgut membranes, e.g. Bacillus thuringiensis subspecies *israelensis* (I172), *Bacillus thuringiensis* subspecies *aizawai* (I173), *Bacillus thuringiensis* subspecies kurstaki (I174), *Bacillus thuringiensis* subspecies tenebrionis (I175), and B.t. crop proteins: Cry1Ab, Cry1Ac, Cry1Fa, Cry1A.105, Cry2Ab, Vip3A, mCry3A, Cry3Ab, Cry3Bb, Cry34 Ab1/35Ab1 (I176); or *Bacillus sphaericus* (I177); (12) Inhibitors of mitochondrial ATP synthase, for example Diafenthiuron (I178); or organotin miticides, e.g. Azocyclotin (I179), Cyhexatin (I180), and Fenbutatin oxide (I181); or Propargite (I182); or Tetradifon (I183); (13) Uncouplers of oxidative phoshorylation via disruption of the proton gradient, for example Chlorfenapyr (I184), DNOC (I185), and Sulfluramid (I186); (14) Nicotinic acetylcholine receptor (nAChR) channel blockers, for example Bensultap (I187), Cartap hydrochloride (I188), Thiocyclam (I189), and Thiosultap-sodium (I190); (15) Inhibitors of chitin biosynthesis, type 0, for example Bistrifluron (I191), Chlorfluazuron (I192), Diflubenzuron (I193), Flucycloxuron (I194), Flufenoxuron (I195), Hexaflumuron (I196), Lufenuron (I197), Novaluron (I198), Noviflumuron (I199), Teflubenzuron (I200), and Triflumuron (I201); (16) Inhibitors of chitin biosynthesis, type 1, for example Buprofezin (I202); (17) Moulting disruptors, for example Cyromazine (I203); (18) Ecdysone receptor agonists, for example Chromafenozide (I204), Halofenozide (I205), Methoxyfenozide (I206), and Tebufenozide (I207); (19) Octopamine receptor agonists, for example Amitraz (I208); (20) Mitochondrial complex III electron transport inhibitors, for example Hydramethylnon (I209); or Acequinocyl (I210); or Fluacrypyrim (I211); (21) Mitochondrial complex I electron transport inhibitors, for example METI acaricides, e.g. Fenazaquin (I212), Fenpyroximate (I213), Pyrimidifen (I214), Pyridaben (I215), Tebufenpyrad (I216), and Tolfenpyrad (I217); or Rotenone (Derris) (I218); (22) Voltage-dependent sodium channel blockers, e.g. Indoxacarb (I219); or Metaflumizone (I220); (23) Inhibitors of acetyl CoA carboxylase, for example tetronic and tetramic acid derivatives, e.g. Spirodiclofen (I221), Spiromesifen (I222), and Spirotetramat (I223); (24) Mitochondrial complex IV electron transport inhibitors, for example phosphines, e.g. Aluminium phosphide (I224), Calcium phosphide (I225), Phosphine (I226), and Zinc phosphide (I227); or Cyanide (I228); (25) Mitochondrial complex 11 electron transport inhibitors, for example beta-ketonitrile derivatives, e.g. Cyenopyrafen (I229) and Cyflumetofen (I230); and (28) Ryanodine receptor modulators, for example diamides, e.g. Chlorantraniliprole (I231), Cyantraniliprole (I232), and Flubendiamide (I233), and/or selected from the group consisting of Amidoflumet (I234), Azadirachtin (I235), Benclothiaz (I236), Benzoximate (I237), Bifenazate (I238), Bromopropylate (I239), Chinomethionat (I240), Cryolite (I241), Dicofol (I242), Diflovidazin (I243), Fluensulfone (I244), Flufenerim (I245), Flufiprole (I246), Fluopyram (I247), Fufenozide (I248), Imidaclothiz (I249), Iprodione (I250), Meperfluthrin (I251), Pyridalyl (I252), Pyrifluquinazon (I253), Tetramethylfluthrin (I254), and iodomethane (I255); furthermore products based on *Bacillus firmus* (including but not limited to strain CNCM I-I582, such as, for example, VOTiVOTM, BioNem) (I256) or one of the following known active compounds: 3-bromo-N-{2-bromo-4-chloro-6-[(1-cyclopropylethyl)carbamoyl]phenyl}-1-(3-chloropyridin-2-yl)-1H-pyrazole-5-carboxamide (I257), 4-{[(6-bromopyridin-3-yl)methyl](2-fluoroethyl)amino}furan-2(5H)-one (I258), 4-{[(6-fluoropyridin-3-yl) methyl](2,2-difluoroethyl) amino}furan-2(5H)-one (I259), 4-{[(2-chloro-1,3-thiazol-5-yl)methyl] (2-fluoroethyl)amino}furan-2(5H)-one (I260), 4-{[(6-chlorpyridin-3-yl)methyl] (2-fluoroethyl) amino}furan-2(5H)-one (I261), Flupyradifurone (I262), 4-{[(6-chlor-5-fluoropyridin-3-yl)methyl] (methyl) amino}furan-2(5H)-one (I263), 4-{[(5,6-dichloropyridin-3-yl)methyl](2-fluoroethyl)amino}furan-2(5H)-one (I264), 4-{[(6-chloro-5-fluoropyridin-3-yl) methyl] (cyclopropyl) amino}furan-2 (5H)-one (I265), 4-{[(6-chloropyridin-3-yl) methyl](cyclopropyl)amino}furan-2(5H)-one (I266), 4-{[(6-chlorpyridin-3-yl)methyl] (methyl)amino}furan-2 (5H)-one (I267), {[1-(6-chloropyridin-3-yl)ethyl](methyl) oxido-A4-sulfanylidene}cyanamide (I268) and its diastereomers {[(1R)-1-(6-chloropyridin-3-yl)ethyllimethyl) oxido-A4-sulfanylidene}cyanamide (A) (I269), and {[(1S)-1-(6-chloropyridin-3-yl)ethyllimethyl)oxido-A4 sulfanylidene}cyanamide (B) (I270) as well as diastereomers [(R)-methyl(oxido){(1R)-1-[6-(trifluoromethyl) pyridin-3-yl]ethyl}-A4-sulfanylidene]cyanamide (A1)) (I271), and [(S)-methyl (oxido){(1S)-1-[6-(trifluoromethyl)pyridin-3-yl]ethyl}-A4-sulfanylidene]cyanamide (A2) (I272), referred to as group of diastereomers A, [(R)-methyl(oxido) {(1S)-1-[6-(trifluoromethyl)pyridin-3-yl]ethyl}-A4-sulfanylidene]cyanamide (B1) (I273), and [(S)-methyl (oxido) {(1R)-1-[6-(trifluoromethyl)pyridin-3-yl]ethyl}-A4 sulfanylidene] cyanamide (B2) (I274), referred to as group of diastereomers B, and 11-(4-chloro-2,6-dimethylphenyl)-12-hydroxy-1,4-dioxa-9-azadispiro[4.2.4.2]tetradec-11-en-10-one (I275), 3-(4'-fluoro-2,4-dimethylbiphenyl-3-yl)-4-hydroxy-8-oxa-1-azaspiro [4.5] dec-3-en-2-one (I276), 1-{2-fluoro-4-methyl-5-[(2,2,2-trifluoroethyl)sulfinyl]phenyl}-3-(trifluoromethyl)-1H-1,2,4-triazol-5-amine (I277), Afidopyropen [(3 S,4aR,12R,12aS,12bS)-3-[(cyclopropylcarbonyl)oxy]-6,12-dihydroxy-4,12b-dimethyl-11-oxo-9-(pyridin-3-yl)-1,3,4,4a,5,6,6a,12,12a,12b-decahydro-2H,11H-benzo[f]pyrano[4,3-b]chromen-4-yl]methyl cyclopropanecarboxylate (I278), 2-cyano-3-(difluoromethoxy)-N,N-dimethylbenzenesulfonamide (I279), 2-cyano-3-(difluoromethoxy)-N-methylbenzenesulfonamide (I280), 2-cyano-3-(difluoromethoxy)-N ethylbenzenesulfonamide (I281), 4-(difluoromethoxy)-N-ethyl-N-methyl-1,2-benzothiazol-3-amine 1,1-dioxide (I282), N-[1-(2,3-dimethylphenyl)-2-(3,5-dimethylphenyl)ethyl]-4,5-dihydro-1,3-thiazol-2-amine (I283), {1'-[(2E)-3-(4-chlorophenyl)prop-2-en-1-yl]-5-fluorospiro[indole-3,4'-piperidin]-1(2H)-yl}(2-chloropyridin-4-yl)methanone (I284), 3-(2,5-dimethylphenyl)-4-hydroxy-8-methoxy-1,8-diazaspiro[4.5]dec-3-en-2-one (I285), 3-(2,5-dimethylphenyl)-8-methoxy-2-oxo-1,8-diazaspiro [4.5]dec-3-en-4-yl ethyl carbonate (I286), 4-(but-2-yn-1-yloxy)-6-(3,5-dimethylpiperidin-1-yl)-5-fluoropyrimidine (I287), (2,2,3,3,4,4,5,5-octafluoropentyl) (3,3,3-trifluoropropyl) malononitrile (I288), (2,2,3,3,4,4,5,5-octafluoropentyl) (3,3,4,4,4-pentafluorobutyl)malononitrile (I289), 8-[2-(cyclopropylmethoxy)-4-(trifluoromethyl) phenoxy]-3-[6 (trifluoromethyl)pyridazin-3-yl]-3-azabicyclo [3.2.1]octane (I290), Flometoquin (I291), PF1364 (CAS-Reg. No. 1204776-60-2) (I292), 5-[5-(3,5-dichlorophenyl)-5-(trifluoromethyl)-4,5-dihydro-1,2-oxazol-3-yl]-2-(1H-1,2,4-triazol-1-yl)benzonitrile (I293), 5-[5-(2-chloropyridin-4-yl)-5-(trifluoromethyl)-4,5-dihydro-1,2-oxazol-3-yl]-2-(1H-1,2,4-triazol-1-yl)benzonitrile (I294), 4-[5-(3,5-dichlorophenyl)-5-(trifluoromethyl)-4,5-dihydro-1,2-oxazol-3-yl]-2-methyl-N-{2-oxo-2-[(2,2,2-trifluoroethyl)amino]ethyl}benzamide (I295), 4-{[(6-chloropyridin-3-yl)methyl](cyclopropyl)amino}-1,3-oxazol-2(5H)-one (I296), 4-{[(6-chloropyridin-3-yl)methyl](2,2-difluoroethyl)amino}-1,3-oxazol-2(5H)-one (I297), 4-{[(6-chloropyridin-3-yl)methyl](ethyl)amino}-1,3-oxazol-2(5H)-one (I298), 4-{[(6-chloropyridin-3-yl)methyl](methyl)amino}-1,3-oxazol-2(5H)-one (I299), Pyflubumide N-[4-(1,1,1,3,3,3-hexafluoro-2-methoxypropan-2-yl)-3-isobutylphenyl]-N-isobutyryl-1,3,5-trimethyl-1H-pyrazole-4-carboxamide (I300), methyl 2-[2-({[3-bromo-1-(3-chloropyridin-2-yl)-1H-pyrazol-5-yl]carbonyl}amino)-5-chloro-3-methylbenzoyl]-2-methylhydrazinecarboxylate (I301), methyl 2-[2-({[3-bromo-1-(3-chloropyridin-2-yl)-1H-pyrazol-5-yl]carbonyl}amino)-5-cyano-3-methylbenzoyl]-2-ethylhydrazinecarboxylate (I302), methyl 2-[2-({[3-bromo-1-(3-chloropyridin-2-yl)-1H-pyrazol-5-yl]carbonyl}amino)-5-cyano-3-methylbenzoyl]-2-methyl hydrazinecarboxylate (I303), methyl 2-[3,5-dibromo-2-({[3-bromo-1-(3-chloropyridin-2-yl)-1H-pyrazol-5-yl]carbonyl}amino)benzoyl]-1,2-diethyl hydrazinecarboxylate (I304), methyl 2-[3,5-dibromo 2-({[3-bromo-1-(3-chloropyridin-2-yl)-1H-pyrazol-5-yl]carbonyl}amino)benzoyl]-2-ethylhydrazine carboxylate (I305), (5RS,7RS;5RS,7SR)-1-(6-chloro-3-pyridylmethyl)-1,2,3,5,6,7-hexahydro-7-methyl-8-nitro-5-propoxyimidazo [1,2-a]pyridine (I306), 2-{6-[2-(54uoropyridin-3-yl)-1,3-thiazol-5-yl]pyridin-2-yl}pyrimidine (I307), 2-{6-[2-(pyridin-3-yl)-1,3-thiazol-5-yl]pyridin-2-yl}pyrimidine (I308), 1-(3-chloropyridin-2-yl)-N-[4-cyano-2-methyl-6-(methylcarbamoyl)phenyl]-3-{[5-(trifluoromethyl)-1H-tetrazol-1-yl]methyl}-1H-pyrazole-5-carboxamide (I309), 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide (I310), N-[2-(tert-butylcarbamoyl)-4-cyano-6-methylphenyl]-1-(3-chloropyridin-2-yl)-3-{[5-(trifluoromethyl)-1H-tetrazol-1-yl]methyl}-1H-pyrazole-5-carboxamide (I311), N-[2-(tert-butylcarbamoyl)-4-cyano-6-methylphenyl]-1-(3-chloropyridin-2-yl)-3-{[5-(trifluoromethyl)-2H-tetrazol-2-yl]methyl}-1H-pyrazole-5-carboxamide (I312), (1E)-N-[(6-chloropyridin-3-yl)methyl]-N'-cyano-N-(2,2-difluoroethyl) ethanimidamide (I313), N-[2-(5-amino-1,3,4-thiadiazol-2-yl)-4-chloro-6-methyl phenyl]-3-bromo-1-(3-chloropyridin-2-yl)-1H-pyrazole-5-carboxamide (I314), methyl 2-[3,5-dibromo-2-({[3-bromo-1-(3-chloropyridin-2-yl)-1H-pyrazol-5-yl]carbonyl}amino) benzoyl]-2-ethyl-1-methyl hydrazinecarboxylate (I315), as well as agrigata, amblyseius, aphelinus, *aphidius*, aphidoletes, artimisinin, beta-cyfluthrin, bisultap, brofluthrinate, bromophos-e, capsaicin, chlorbenzuron, cnidiadin, dacnusa, 2,6-Dichlorophenolindophenol (DCIP), dichloropropene, dimethacarb, dithioether, dodecyl-acetate, encarsia, eretmocerus, ethylene-dibromide, eucalyptol, flubrocythrinate, flufenzine, formothion, *harmonia*, indol-3-ylbutyric acid, isocarfobos, isofenphos, isofenphos-m, isoprocarb, isothioate, lindane, liuyangmycin, matrine, mephosfolan, metaldehyde, metarhizium-anisopliae, mirex, m-isothiocyanate, monosultap, oleic-acid, orius, oxymatrine, *paecilomyces*, pasteuria, pheromones, phosphorus-acid, *photorhabdus*, phytoseiulus, pirimiphos-e, potassium-oleate, prosuler, pyrethrins, pyriproxifen, quinomethionate, saponin, saponozit, sodium-fluosilicate, steinernema, *trichoderma*, trichogramma, *verticillium*, vertrine, isomeric insecticides (e.g., kappa-bifenthrin, kappa-tefluthrin), dichoromezotiaz, broflanilide, pyraziflumid; A1) the class of carbamates, including aldicarb, alanycarb, benfuracarb, carbaryl, carbofuran, carbosulfan, methiocarb, methomyl, oxamyl, pirimicarb, propoxur and thiodicarb; A2) the class of organophosphates, including acephate, azinphos-ethyl, azinphos-methyl, chlorfenvinphos, chlorpyrifos, chlorpyrifos-methyl, demeton-S-methyl, diazinon, dichlorvos/DDVP, dicrotophos, dimethoate, disulfoton, ethion, fenitrothion, fenthion, isoxathion, malathion, methamidaphos, methidathion, mevinphos, monocrotophos, oxymethoate, oxydemeton-methyl, parathion, parathion-methyl, phenthoate, phorate, phosalone, phosmet, phosphamidon, quinalphos, terbufos, tetrachlorvinphos, triazophos and trichlorfon; A3) the class of cyclodiene organochlorine compounds such as endosulfan; A4) the class of fiproles, including ethiprole, fipronil, pyrafluprole and pyriprole; A5) the class of neonicotinoids, including acetamiprid, clothianidin, dinotefuran, imidacloprid, nitenpyram, thiacloprid and thiamethoxam; A6) the class of spinosyns such as spinosad and spinetoram; A7) chloride channel activators from the class of mectins, including abamectin, emamectin benzoate, ivermectin, lepimectin and milbemectin; A8) juvenile hormone mimics such as hydroprene, kinoprene, methoprene, fenoxycarb and pyriproxyfen; A9) selective homopteran feeding blockers such as pymetrozine, flonicamid and pyrifluquinazon; A10) mite growth inhibitors such as clofentezine, hexythiazox and etoxazole; A11) inhibitors of mitochondrial ATP synthase such as diafenthiuron, fenbutatin oxide and propargite; uncouplers of oxidative phosphorylation such as chlorfenapyr; A12) nicotinic acetylcholine receptor channel blockers such as bensultap, cartap hydrochloride, thiocyclam and thiosultap sodium; A13) inhibitors of the chitin biosynthesis type 0 from the benzoylurea class, including bistrifluron, diflubenzuron, flufenoxuron, hexaflumuron, lufenuron, novaluron and teflubenzuron; A14) inhibitors of the chitin biosynthesis type 1 such as buprofezin; A15) moulting disruptors such as cyromazine; A16) ecdyson receptor agonists such as methoxyfenozide, tebufenozide, halofenozide and chromafenozide; A17) octopamin receptor agonists such as amitraz; A18) mitochondrial complex electron transport inhibitors pyridaben, tebufenpyrad, tolfenpyrad, flufenerim, cyenopyrafen, cyflumetofen, hydramethylnon, acequinocyl or fluacrypyrim; A19) voltage-dependent sodium channel blockers such as indoxacarb and metaflumizone; A20) inhibitors of the lipid synthesis such as spirodiclofen, spiromesifen and spirotetramat; A21) ryanodine receptor-modulators from the class of diamides, including flubendiamide, the phthalamide compounds ( )-3-Chlor-N1-{2-methyl-4-[1,2,2,2-tetrafluor-1-(trifluormethyl)ethyl]phenyl)}-N2-(l-methyl-2-methylsulfonylethyl)phthalamid and (S)-3-Chlor-N1-{2-methyl-4-[1,2,2,2-tetrafluor-1-(trifluormethyl)ethyl]phenyl)}-N2-(1-methyl-2-methylsulfonylethyl)phthalamid, chloranthraniliprole and cy-anthraniliprole; A22) compounds of unknown or uncertain mode of action such as azadirachtin, amidoflumet, bifenazate, fluensulfone, piperonyl butoxide, pyridalyl, sulfoxaflor; or A23) sodium channel modulators from the class of pyrethroids, including acrinathrin, allethrin, bifenthrin, cyfluthrin, lambda-cyhalothrin, cyper-methrin, alpha-cypermethrin, beta-cypermethrin, zeta-cypermethrin, deltamethrin, esfenvalerate, etofenprox, fenpropathrin, fenvalerate, flucythrinate, tau-fluvalinate, permethrin, silafluofen and tralomethrin, and combinations thereof.

In some embodiments, the plant treatment product comprises two or more (i.e., a plurality of) insecticides. For instance, the plant treatment product can comprise a first insecticide, preferably selected from the above-listed group, and a second insecticide, preferably selected from the above-listed group, and which is different from a first insecticide. Some embodiments can include, for example, a third insecticide, preferably selected from the above-listed group, and which is different from a first insecticide and the second insecticide.

Illustrative Antimicrobial Pesticides

In some embodiments, the pesticide can be or comprise a (chemical) antimicrobial (e.g., antibiotic, antiparasitic, antiviral, bactericide, fungicide, etc.). In some embodiments, one or more antimicrobial pesticides can be used to inhibit or destroy the microorganisms which occur on plants or on parts of plants (the fruit, blossom, leaves, stems, tubers or roots) of different crops of useful plants to provide protection (e.g. against fungus infections, phyto-pathogenic fungi which occur in the soil or plant pathogenic insects). Without being bound to any theory, the type of pathogen and the type of plant typically determines the type of active ingredients to be used to prepare the plant treatment product(s). The targeted pathogens include, but are not limited to, phytopathogenic fungi, such as Ascomycetes (e.g. *Venturia, Podosphaera, Erysiphe, Monilinia, Mycosphaerella, Uncinula*); Basidiomycetes (e.g. *Hemiieia, Rhizoctonia, Puccinia*); *Fungi imperfecti* (e.g. *Botrytis, Helminthosporium, Rhynchosporium, Fusarium, Septoria, Cercospora, Alternaria, Pyricularia* and *Pseudocercosporella herpotrichoides*); Oomycetes (e.g. *Phytophthora, Peronospora, Bremia, Pythium, Plasmopara*), *Gaeumannomyces graminis* (take-all), *Erysiphe graminis* (mildew). Plant types include, but are not limited to varieties of soybean, wheat, rice, corn (or maize), barley, oats, pea, hay (or alfalfa), tomato, potato, avocado, and other crop (and non-crop) plants.

In some embodiments, the pesticide can be or comprise one or more (synthetic) chemical, molecule, or compound, or a mixture of two or more (synthetic) chemicals, molecules, or compounds. A wide variety of (chemical) antimicrobial pesticides are commercially available and known to those skilled in the art, each of which is contemplated herein.

Illustrative Fungicides

In some embodiments, the pesticide can be or comprise a (chemical) fungicide. A wide variety of (chemical) fungicides are commercially available and known to those skilled in the art, each of which is contemplated herein. Illustrative (chemical) fungicides include, but are not limited to, the azoles, e.g. fluquinconazole (Agrevo), cyproconazole (Novartis), triticonazole (Rhone-Poulenc), the phenylpyrroles, e.g. fenpiclonil or fludioxonii (both Novartis) and other structural types like capropamide, fluthiamide, spiroxamin, (all Bayer AG), and the strobilurines (BASF AG), e.g. azoxystrobin. The (chemical) fungicides or active ingredients (a.i.) thereof have different trade names, e.g. spiroxamin is Impulse® for wheat, or capropamide is Win® for rice. Vitavax® contains carboxin and thiram to treat wheat, barley and oat seeds, Baytan R30® protects against *septoria*, mildew or take-all. Tebuconazole is the active ingredient in Raxil® to protect wheat, barley and oats. Further examples are given by the product providers, e.g. by the catalogue of Gustavson Inc. (http://www.gustafson.com/).

According to one embodiment of the present disclosure preferred fungicides are selected from the group consisting of: one or more (1) Inhibitors of the ergosterol biosynthesis, for example (F1) aldimorph (1704-28-5), (F2) azaconazole (60207-31-0), (F3) bitertanol (55179-31-2), (F4) bromuconazole (116255-48-2), (F5) cyproconazole (113096-99-4), (F6) diclobutrazole (75736-33-3), (F7) difenoconazole (II9446-68-3), (F8) diniconazole (83657-24-3), (F9) diniconazole-M (83657-18-5), (F10) dodemorph (1593-77-7), (F11) dodemorph acetate (31717-87-0), (F12) epoxiconazole (106325-08-0), (F13) etaconazole (60207-93-4), (F14) fenarimol (60168-88-9), (F15) fenbuconazole (I14369-43-6), (F16) fenhexamid (I26833-17-8), (F17) fenpropidin (67306-00-7), (F18) fenpropimorph (67306-03-0), (F19) fluquinconazole (I36426-54-5), (F20) flurprimidol (56425-91-3), (F21) flusilazole (85509-19-9), (F22) flutriafol (76674-21-0), (F23) furconazole (112839-33-5), (F24) furconazole-cis (112839-32-4), (F25) hexaconazole (79983-71-4), (F26) imazalil (60534-80-7), (F27) imazalil sulfate (58594-72-2), (F28) imibenconazole (86598-92-7), (F29) ipconazole (I25225-28-7), (F30) metconazole (I25116-23-6), (F31) myclobutanil (88671-89-0), (F32) naftifine (65472-88-0), (F33) nuarimol (63284-71-9), (F34) oxpoconazole (174212-12-5), (F35) paclobutrazol (76738-62-0), (F36) pefurazoate (101903-30-4), (F37) penconazole (66246-88-6), (F38) piperalin (3478-94-2), (F39) prochloraz (67747-09-5), (F40) propiconazole (60207-90-1), (F41) prothioconazole (178928-70-6), (F42) pyributicarb (88678-67-5), (F43) pyrifenox (88283-41-4), (F44) quinconazole (103970-75-8), (F45) simeconazole (149508-90-7), (F46) spiroxamine (I18134-30-8), (F47) tebuconazole (107534-96-3), (F48) terbinafine (91161-71-6), (F49) tetraconazole (112281-77-3), (F50) triadimefon (43121-43-3), (F51) triadimenol (89482-17-7), (F52) tridemorph (81412-43-3), (F53) triflumizole (68694-11-1), (F54) triforine (26644-46-2), (F55) triticonazole (131983-72-7), (F56) uniconazole (83657-22-1), (F57) uniconazole-p (83657-17-4), (F58) viniconazole (77174-66-4), (F59) voriconazole (137234-62-9), (F60) 1-(4-chlorophenyl)-2-(H-1,2,4-triazol-1-yl)cycloheptanol (129586-32-9), (F61) methyl 1-(2,2-dimethyl-2,3-dihydro-1H-inden-1-yl)-1H-imidazole-5-carboxylate (110323-95-0), (F62) N'-(5-(difluoromethyl)-2-methyl-4-[3-(trimethylsilyl)propoxy]phenyl)-N-ethyl-N-methylimidoformamide, (F63) N-ethyl-N-methyl-N'-{2-methyl-5-(trifluoromethyl)-4-[3-(trimethylsilyl)propoxy]phenyl}imidoformamide, (F64) 0-[1-(4-methoxyphenoxy)-3,3-dimethylbutan-2-yl]1H-imidazole-1-carbothioate (I11226-71-2); (2) inhibitors of the respiratory chain at complex I or II, for example (F65) bixafen (581809-46-3), (F66) boscalid (188425-85-6), (F67) carboxin (5234-68-4), (F68) diflumetorim (130339-07-0), (F69) fenfuram (24691-80-3), (F70) fluopyram (658066-35-4), (F71) flutolanil (66332-96-5), (F72) fluxapyroxad (907204-31-3), (F73) furametpyr (123572-88-3), (F74) furmecyclox (60568-05-0), (F75) isopyrazam (mixture of syn-epimeric racemate 1 RS,4SR,9RS and anti-epimeric racemate 1RS,4SR,9SR) (881685-58-1), (F76) isopyrazam (anti-epimeric racemate 1 RS,4SR,9SR), (F77) isopyrazam (anti-epimeric enantiomer 1R,4S,9S), (F78) isopyrazam (anti-epimeric enantiomer 1S,4R,9R), (F79) isopyrazam (syn epimeric racemate 1 RS,4SR,9RS), (F80) isopyrazam (syn-epimeric enantiomer 1R,4S,9R), (F81) isopyrazam (syn-epimeric enantiomer 1S,4R,9S), (F82) mepronil (55814-41-0), (F83) oxycarboxin (5259-88-1), (F84) penflufen (494793-67-8), (F85) penthiopyrad (183675-82-3), (F86) sedaxane (874967-67-6), (F87) thifluzamide (130000-40-7), (F88) 1-methyl-N-[2-(1,1,2,2-tetrafluoroethoxy)phenyl]-3-(trifluoromethyl)-1H-pyrazole-4-carboxamide, (F89) 3-(difluoromethyl)-1-methyl-N-[2-(1,1,2,2-tetrafluoroethoxy)phenyl]-1H-pyrazole-4-carboxamide, (F90) 3-(difluoromethyl)-N-[4-fluoro-2-(1,1,2,3,3,3-hexafluoropropoxy)phenyl]-1-methyl-1H-pyrazole-4-carboxamide, (F91) N-[1-(2,4-dichlorophenyl)-1-methoxypropan-2-yl]-3-(difluoromethyl)-1-methyl-1H-pyrazole-4-carboxamide (1092400-95-7), (F92) 5,8-difluoro-N-[2-(2-fluoro-4-{[4-(trifluoromethyl)pyridin-2-yl]oxy}phenyl)ethyl]quinazolin-4-amine (1210070-84-0), (F93) benzovindiflupyr, (F94) N-[(1 S,4R)-9-(dichloromethylene)-1,2,3,4-tetrahydro-1,4-methanonaphthalen-5-yl]-3-(difluoromethyl)-1-methyl-1H-pyrazole-4-carboxamide, (F95) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (F96) 3-(Difluormethyl)-1-methyl-N-(1,1,3-trimethyl-2,3-dihydro-1H-inden-4-yl)-1H-pyrazol-4-carboxamid, (F97) 1,3,5-Trimethyl-N-(1,1,3-trimethyl-2,3-dihydro-1H-inden-4-yl)-1H-pyrazol-4-carboxamid, (F98) 1-Methyl-3-(trifluormethyl)-N-(1,3,3-trimethyl-2,3-dihydro-1H-inden-4-yl)-1H-pyrazol-4-carboxamid, (F99) 1-Methyl-3-(trifluormethyl)-N-[(1 S)-1,3,3-trimethyl-2,3-dihydro-1H-inden-4-yl]-1H-pyrazol-4-carboxamid, (F100) 1-Methyl-3-(trifluormethyl)-N-[(R)-1,3,3-trimethyl-2,3-dihydro-1H-inden-4-yl]-1H-pyrazol-4-carboxamid, (F101) 3-(Difluormethyl)-1-methyl-N-[(3 S)-1,1,3-trimethyl-2,3-dihydro-1H-inden-4-yl]-1H-pyrazol-4-carboxamid, (F102) 3-(Difluormethyl)-1-methyl-N-[(3R)-1,1,3-trimethyl-2,3-dihydro-1H-inden-4-yl]-1H-pyrazol-4-carboxamid, (F103) 1,3,5-Trimethyl-N-[(3R)-1,1,3-trimethyl-2,3-dihydro-1H-inden-4-yl]-1H-pyrazol-4-carboxamid, (F104) 1,3,5-Trimethyl-N-[(3S)-1,1,3-trimethyl-2,3-dihydro-1H-inden-4-yl]-1H-pyrazol-4-carboxamid; (3) inhibitors of the respiratory chain at complex III, for example (F105) ametoctradin (865318-97-4), (F106) amisulbrom (348635-87-0), (F107) azoxystrobin (131860-33-8), (F108) cyazofamid (120116-88-3), (F109) coumethoxystrobin (850881-30-0), (F110) coumoxystrobin (850881-70-8), (F111) dimoxystrobin (141600-52-4), (F112) enestroburin (238410-11-2), (F113) famoxadone (131807-57-3), (F114) fenamidone (161326-34-7), (F115) fenoxystrobin (918162-02-4), (F116) fluoxastrobin (361377-29-9), (F117) kresoxim-methyl (143390-89-0), (F118) metominostrobin (133408-50-1), (F119) orysastrobin (189892-69-1), (F120) picoxystrobin (117428-22-5), (F121) pyraclostrobin (175013-18-0), (F122) pyrametostrobin (915410-70-7), (F123) pyraoxystrobin (862588-11-2), (F124) pyribencarb (799247-52-2), (F125) triclopyricarb (902760-40-1), (F126) trifloxystrobin (141517-21-7), (F127) (2E)-2-(2-{[6-(3-chloro-2-methylphenoxy)-5-fluoropyrimidin-4-yl]oxy}phenyl)-2-(methoxyimino)-N-methylethanamide, (F128) (2E)-2-(methoxyimino)-N-methyl-2-(2-{[({(1E)-1-[3-(trifluoromethyl)phenyl]ethylidene}amino)oxy]methyl}phenyl)ethanamide, (F129) (2E)-2-(methoxyimino)-N-methyl-2-{2-[(E)-({1-[3-(trifluoromethyl)phenyl]ethoxy}imino)methyl]phenyl}ethanamide (158169-73-4), (F130) (2E)-2-{2-[({[(1E)-1-(3-[(E)-1-fluoro-2-phenylethenyl]oxy}phenyl)ethylidene]amino}oxy)methyl]phenyl)-2-(methoxyimino)-N-methylethanamide (326896-28-0), (F131) (2E)-2-{2-[({[(2E,3E)-4-(2,6-dichlorophenyl)but-3-en-2-ylidene]amino}oxy)methyl]phenyl}-2-(methoxyimino)-N-methylethanamide, (F132) 2-chloro-N-(1,1,3-trimethyl-2,3-dihydro-1H-inden-4-yl)pyridine-3-carboxamide (119899-14-8), (F133) 5-methoxy-2-methyl-4-(2-{[({(1E)-1-[3-(trifluoromethyl)phenyl]ethylidene}amino)oxy]methyl) phenyl)-2,4-dihydro-3H-1,2,4-triazol-3-one, (F134) methyl (2E)-2-{2-[((cyclopropyl[(4-methoxyphenyl)imino]methyl}sulfanyl)methyl]phenyl}-3-methoxyprop-2-enoate (149601-03-6), (F135) N-(3-ethyl-3,5,5-trimethylcyclohexyl)-3-(formylamino)-2-hydroxybenzamide (226551-21-9), (F136) 2-{2-[(2,5-dimethylphenoxy)methyl]phenyl}-2-methoxy-N-methylacetamide (173662-97-0), (F137) (2R)-2-{2-[(2,5-dimethylphenoxy) methyl]phenyl}-2-methoxy-N-methylacetamide (394657-24-0); (4) Inhibitors of the mitosis and cell division, for example (F138) benomyl (17804-35-2), (F139) carbendazim (10605-21-7), (F140) chlorfenazole (3574-96-7), (F141) diethofencarb (87130-20-9), (F142) ethaboxam (162650-77-3), (F143) fluopicolide (239110-15-7), (F144) fuberidazole (3878-19-1), (F145) pencycuron (66063-05-6), (F146) thiabendazole (148-79-8), (F147) thiophanate-methyl (23564-05-8), (F148) thiophanate (23564-06-9), (F149) zoxamide (156052-68-5), (F150) 5-chloro-7-(4-methylpiperidin-1-yl)-6-(2,4,6-trifluorophenyl) [1,2,4]triazolo[1,5-a]pyrimidine (214706-53-3), (F151) 3-chloro-5-(6-chloropyridin-3-yl)-6-methyl-4-(2,4,6-trifluorophenyl)pyridazine (1002756-87-7); (5) Compounds capable to have a multisite action, like for example (F152) bordeaux mixture (8011-63-0), (F153) captafol (2425-06-1), (F154) captan (133-06-2), (F155) chlorothalonil (1897-45-6), (F156) copper hydroxide (20427-59-2), (F157) copper naphthenate (1338-02-9), (F158) copper oxide (1317-39-1), (F159) copper oxychloride (1332-40-7), (F160) copper (2+) sulfate (7758-98-7), (F161) dichlofluanid (1085-98-9), (F162) dithianon (3347-22-6), (F163) dodine (2439-10-3), (F164) dodine free base, (F165) ferbam (14484-64-1), (F166) fluorofolpet (719-96-0), (F167) folpet (133-07-3), (F168) guazatine (108173-90-6), (F169) guazatine acetate, (F170) iminoctadine (13516-27-3), (F171) iminoctadine albesilate (169202-06-6), (F172) iminoctadine triacetate (57520-17-9), (F173) mancopper (53988-93-5), (F174) mancozeb (8018-01-7), (F175) maneb (12427-38-2), (F176) metiram (9006-42-2), (F177) metiram zinc (9006-42-2), (F178) oxine-copper (10380-28-6), (F179) propamidine (104-32-5), (F180) propineb (12071-83-9), (F181) sulphur and sulphur preparations including calcium polysulphide (7704-34-9), (F182) thiram (137-26-8), (F183) tolylfluanid (731-27-1), (F184) zineb (12122-67-7), (F185) ziram (137-30-4); (6) Compounds capable to induce a host defense, like for example (F186) acibenzolar-S-methyl (135158-54-2), (F187) isotianil (224049-04-1), (F188) probenazole (27605-76-1), (F189) tiadinil (223580-51-6); (7) Inhibitors of the amino acid and/or protein biosynthesis, for example (F190) andoprim (23951-85-1), (F191) blasticidin-S (2079-00-7), (F192) cyprodinil (121552-61-2), (F193) kasugamycin (6980-18-3), (F194)

kasugamycin hydrochloride hydrate (19408-46-9), (F195) mepanipyrim (110235-47-7), (F196) pyrimethanil (53112-28-0), (F197) 3-(5-fluoro-3,3,4,4-tetramethyl-3,4-dihydroisoquinolin-1-yl)quinoline (861647-32-7); (8) Inhibitors of the ATP production, for example (F198) fentin acetate (900-95-8), (F199) fentin chloride (639-58-7), (F200) fentin hydroxide (76-87-9), (F201) silthiofam (175217-20-6); (9) Inhibitors of the cell wall synthesis, for example (F202) benthiavalicarb (177406-68-7), (F203) dimethomorph (110488-70-5), (F204) flumorph (211867-47-9), (F205) iprovalicarb (140923-17-7), (F206) mandipropamid (374726-62-2), (F207) polyoxins (11113-80-7), (F208) polyoxorim (22976-86-9), (F209) validamycin A (37248-47-8), (F210) valifenalate (283159-94-4; 283159-90-0); (10) Inhibitors of the lipid and membrane synthesis, for example (F211) biphenyl (92-52-4), (F212) chloroneb (2675-77-6), (F213) dicloran (99-30-9), (F214) edifenphos (17109-49-8), (F215) etridiazole (2593-15-9), (F216) iodocarb (55406-53-6), (F217) iprobenfos (26087-47-8), (F218) isoprothiolane (50512-35-1), (F219) propamocarb (25606-41-1), (F220) propamocarb hydrochloride (25606-41-1), (F221) prothiocarb (19622-08-3), (F222) pyrazophos (13457-18-6), (F223) quintozene (82-68-8), (F224) tecnazene (117-18-0), (F225) tolclofos-methyl (57018-04-9); (11) Inhibitors of the melanine biosynthesis, for example (F226) carpropamid (104030-54-8), (F227) diclocymet (139920-32-4), (F228) fenoxanil (115852-48-7), (F229) phthalide (27355-22-2), (F230) pyroquilon (57369-32-1), (F231) tricyclazole (41814-78-2), (F232) 2,2,2-trifluoroethyl {3-methyl-1-[(4-methylbenzoyl)amino]butan-2-yl}carbamate (851524-22-6); (12) Inhibitors of the nucleic acid synthesis, for example (F233) benalaxyl (71626-11-4), (F234) benalaxyl-M (kiralaxyl) (98243-83-5), (F235) bupirimate (41483-43-6), (F236) clozylacon (67932-85-8), (F237) dimethirimol (5221-53-4), (F238) ethirimol (23947-60-6), (F239) furalaxyl (57646-30-7), (F240) hymexazol (10004-44-1), (F241) metalaxyl (57837-19-1), (F242) metalaxyl-M (mefenoxam) (70630-17-0), (F243) ofurace (58810-48-3), (F244) oxadixyl (77732-09-3), (F245) oxolinic acid (14698-29-4); (13) Inhibitors of the signal transduction, for example (F246) chlozolinate (84332-86-5), (F247) fenpiclonil (74738-17-3), (F248) fludioxonil (131341-86-1), (F249) iprodione (36734-19-7), (F250) procymidone (32809-16-8), (F251) quinoxyfen (124495-18-7), (F252) vinclozolin (50471-44-8); 14) Compounds capable to act as an uncoupler, like for example (F253) binapacryl (485-31-4), (F254) dinocap (131-72-6), (F255) ferimzone (89269-64-7), (F256) fluazinam (79622-59-6), (F257) meptyldinocap (131-72-6); (15) Further compounds, like for example (F258) benthiazole (21564-17-0), (F259) bethoxazin (163269-30-5), (F260) capsimycin (70694-08-5), (F261) carvone (99-49-0), (F262) chinomethionat (2439-01-2), (F263) pyriofenone (chlazafenone) (688046-61-9), (F264) cufraneb (11096-18-7), (F265) cyflufenamid (180409-60-3), (F266) cymoxanil (57966-95-7), (F267) cyprosulfamide (221667-31-8), (F268) dazomet (533-74-4), (F269) debacarb (62732-91-6), (F270) dichlorophen (97-23-4), (F271) diclomezine (62865-36-5), (F272) difenzoquat (49866-87-7), (F273) difenzoquat methylsulphate (43222-48-6), (F724) diphenylamine (122-39-4), (F275) ecomate, (F276) fenpyrazamine (473798-59-3), (F277) flumetover (154025-04-4), (F278) fluoroimide (41205-21-4), (F279) flusulfamide (106917-52-6), (F280) flutianil (304900-25-2), (F281) fosetyl-aluminium (39148-24-8), (F282) fosetyl-calcium, (F283) fosetyl-sodium (39148-16-8), (F284) hexachlorobenzene (118-74-1), (F285) irumamycin (81604-73-1), (F286) methasulfocarb (66952-49-6), (F287) methyl isothiocyanate (556-61-6), (F288) metrafenone (220899-03-6), (F289) mildiomycin (67527-71-3), (F290) natamycin (7681-93-8), (F291) nickel dimethyldithiocarbamate (15521-65-0), (F292) nitrothal-isopropyl (10552-74-6), (F293) octhilinone (26530-20-1), (F294) oxamocarb (917242-12-7), (F295) oxyfenthiin (34407-87-9), (F296) pentachlorophenol and salts (87-86-5), (F297) phenothrin, (F298) phosphorous acid and its salts (13598-36-2), (F299) propamocarb-fosetylate, (F300) propanosine-sodium (88498-02-6), (F301) proquinazid (189278-12-4), (F302) pyrimorph (868390-90-3), (F303) (2E)-3-(4-tert-butylphenyl)-3-(2-chloropyridin-4-yl)-1-(morpholin-4-yl)prop-2-en-1-one (1231776-28-5), (F304) (2Z)-3-(4-tert-butylphenyl)-3-(2-chloropyridin-4-yl)-1-(morpholin-4-yl)prop-2-en-1-one (1231776-29-6), (F305) pyrrolnitrine (1018-71-9), (F306) tebufloquin (376645-78-2), (F307) tecloftalam (76280-91-6), (F308) tolnifanide (304911-98-6), (F309) triazoxide (72459-58-6), (F310) trichlamide (70193-21-4), (F311) zarilamid (84527-51-5), (F312) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate (517875-34-2), (F313) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone (1003319-79-6), (F314) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone (1003319-80-9), (F315) 1-(4-{4-[5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone (1003318-67-9), (F316) 1-(4-methoxyphenoxy)-3,3-dimethylbutan-2-yl 1H-imidazole-1-carboxylate (111227-17-9), (F317) 2,3,5,6-tetrachloro-4-(methylsulfonyl)pyridine (13108-52-6), (F318) 2,3-dibutyl-6-chlorothieno[2,3-d]pyrimidin-4(3H)-one (221451-58-7), (F319) 2,6-dimethyl-1H,5H-[1,4]dithiino[2,3-c:5,6-c']dipyrrole-1,3,5,7 (2H,6H)-tetrone, (F320) 2-[5-methyl-3-(trifluoromethyl)-1H-pyrazol-1-yl]-1-(4-{4-[(5R)-5-phenyl-4,5-dihydro-1,2-oxazol-3-yl]-1,3-thiazol-2-yl}piperidin-1-yl)ethanone (1003316-53-7), (F321) 2-[5-methyl-3-(trifluoromethyl)-1H-pyrazol-1-yl]-1-(4-{4-[(5S)-5-phenyl-4,5-dihydro-1,2-oxazol-3-yl]-1,3-thiazol-2-yl}piperidin-1-yl)ethanone (1003316-54-8), (F322) 2-[5-methyl-3-(trifluoromethyl)-1H-pyrazol-1-yl]-1-{4-[4-(5-phenyl-4,5-dihydro-1,2-oxazol-3-yl)-1,3-thiazol-2-yl]piperidin-1-yl}ethanone (1003316-51-5), (F323) 2-butoxy-6-iodo-3-propyl-4H-chromen-4-one, (F324) 2-chloro-5-[2-chloro-1-(2,6-difluoro-4-methoxyphenyl)-4-methyl-1H-imidazol-5-yl]pyridine, (F325) 2-phenylphenol and salts (90-43-7), (F326) 3-(4,4,5-trifluoro-3,3-dimethyl-3,4-dihydroisoquinolin-1-yl)quinoline (861647-85-0), (F327) 3,4,5-trichloropyridine-2,6-dicarbonitrile (17824-85-0), (F328) 3-[5-(4-chlorophenyl)-2,3-dimethyl-1,2-oxazolidin-3-yl]pyridine, (F329) 3-chloro-5-(4-chlorophenyl)-4-(2,6-difluorophenyl)-6-methylpyridazine, (F330) 4-(4-chlorophenyl)-5-(2,6-difluorophenyl)-3,6-dimethylpyridazine, (F331) 5-amino-1,3,4-thiadiazole-2-thiol, (F332) 5-chloro-N'-phenyl-N'-(prop-2-yn-1-yl)thiophene-2-sulfonohydrazide (134-31-6), (F333) 5-fluoro-2-[(4-fluorobenzyl)oxy]pyrimidin-4-amine (1174376-11-4), (F334) 5-fluoro-2-[(4-methylbenzyl)oxy]pyrimidin-4-amine (1174376-25-0), (F335) 5-methyl-6-octyl [1,2,4]triazolo [1,5-a]pyrimidin-7-amine, (F336) ethyl (2Z)-3-amino-2-cyano-3-phenylprop-2-enoate, (F337) N'-(4-{[3-(4-chlorobenzyl)-1,2,4-thiadiazol-5-yl]oxy}-2,5-dimethylphenyl)-N-ethyl-N-methylimidoformamide, (F338) N-(4-chlorobenzyl)-3-[3-methoxy-4-(prop-2-yn-1-yloxy)

phenyl]propanamide, (F339) N-[(4-chlorophenyl)(cyano) methyl]-3-[3-methoxy-4-(prop-2-yn-1-yloxy)phenyl]propanamide, (F340) N-[(5-bromo-3-chloropyridin-2-yl) methyl]-2,4-dichloropyridine-3-carboxamide, (F341) N-[1-(5-bromo-3-chloropyridin-2-yl)ethyl]-2,4-dichloropyridine-3-carboxamide, (F342) N-[1-(5-bromo-3-chloropyridin-2-yl)ethyl]-2-fluoro-4-iodopyridine-3-carboxamide, (F343) N-{(E)-[(cyclopropylmethoxy)imino] [6-(difluoromethoxy)-2,3-difluorophenyl]methyl}-2-phenylacetamide (221201-92-9), (F344) N-{(Z)-[(cyclopropylmethoxy) imino] [6-(difluoromethoxy)-2,3-difluorophenyl]methyl}-2-phenylacetamide (221201-92-9), (F345) N'-(4-[(3-tert-butyl-4-cyano-1,2-thiazol-5-yl)oxy]-2-chloro-5-methylphenyl)-N-ethyl-N-methylimidoformamide, (F346) N-methyl-2-(1-{[5-methyl-3-(trifluoromethyl)-1H-pyrazol-1-yl]acetyl}piperidin-4-yl)-N-(1,2,3,4-tetrahydronaphthalen-1-yl)-1,3-thiazole-4-carboxamide (922514-49-6), (F347) N-methyl-2-(1-{[5-methyl-3-(trifluoromethyl)-1H-pyrazol-1-yl]acetyl}piperidin-4-yl)-N-[(1R)-1,2,3,4-tetrahydronaphthalen-1-yl]-1,3-thiazole-4-carboxamide (922514-07-6), (F348) N-methyl-2-(1-{[5-methyl-3-(trifluoromethyl)-1H-pyrazol-1-yl] acetyl}piperidin-4-yl)-N-[(1S)-1,2,3,4-tetrahydronaphthalen-1-yl]-1,3-thiazole-4-carboxamide (922514-48-5), (F349) pentyl {6-[({[(1-methyl-1H-tetrazol-5-yl) (phenyl)methylidene]amino}oxy) methyl]pyridin-2-yl)carbamate, (F350) phenazine-1-carboxylic acid, (F351) quinolin-8-ol (134-31-6), (F352) quinolin-8-ol sulfate (2:1) (134-31-6), (F353) tert-butyl {6-[({[(1-methyl-1H-tetrazol-5-yl) (phenyl)methylene] amino}oxy)methyl]pyridin-2-yl}carbamate; (16) Further compounds, like for example (F354) 1-methyl-3-(trifluoromethyl)-N-[2'-(trifluoromethyl)biphenyl-2-yl]-1H-pyrazole-4-carboxamide, (F355) N-(4'-chlorobiphenyl-2-yl)-3-(difluoromethyl)-1-methyl-1H-pyrazole-4-carboxamide, (F356) N-(2',4'-dichlorobiphenyl-2-yl)-3-(difluoromethyl)-1-methyl-1H-pyrazole-4-carboxamide, (F357) 3-(difluoromethyl)-1-methyl-N-[4'-(trifluoromethyl)biphenyl-2-yl]-1H-pyrazole-4-carboxamide, (F358) N-(2',5'-difluorobiphenyl-2-yl)-1-methyl-3-(trifluoromethyl)-1H-pyrazole-4-carboxamide, (F359) 3-(difluoromethyl)-1-methyl-N-[4'-(prop-1-yn-1-yl)biphenyl-2-yl]-1H-pyrazole-4-carboxamide, (F360) 5-fluoro-1,3-dimethyl-N-[4'-(prop-1-yn-1-yl)biphenyl-2-yl]-1H-pyrazole-4-carboxamide, (F361) 2-chloro-N-[4'-(prop-1-yn-1-yl)biphenyl-2-yl]pyridine-3-carboxamide, (F362) 3-(difluoromethyl)-N-[4'-(3,3-dimethylbut-1-yn-1-yl)biphenyl-2-yl]-1-methyl-1H-pyrazole-4-carboxamide, (F363) N-[4'-(3,3-dimethylbut-1-yn-1-yl)biphenyl-2-yl]-5-fluoro-1,3-dimethyl-1H-pyrazole-4-carboxamide, (F364) 3-(difluoromethyl)-N-(4'-ethynylbiphenyl-2-yl)-1-methyl-1H-pyrazole-4-carboxamide, (F365) N-(4'-ethynylbiphenyl-2-yl)-5-fluoro-1,3-dimethyl-1H-pyrazole-4-carboxamide, (F366) 2-chloro-N-(4'-ethynylbiphenyl-2-yl)pyridine-3-carboxamide, (F367) 2-chloro-N-[4'-(3,3-dimethylbut-1-yn-1-yl)biphenyl-2-yl]pyridine-3-carboxamide, (F368) 4-(difluoromethyl)-2-methyl-N-[4'-(trifluoromethyl) biphenyl-2-yl]-1,3-thiazole-5-carboxamide, (F369) 5-fluoro-N-[4'-(3-hydroxy-3-methylbut-1-yn-1-yl)biphenyl-2-yl]-1,3-dimethyl-1H-pyrazole-4-carboxamide, (F370) 2-chloro-N-[4'-(3-hydroxy-3-methylbut-1-yn-1-yl)biphenyl-2-yl]pyridine-3-carboxamide, (F371) 3-(difluoromethyl)-N-[4'-(3-methoxy-3-methylbut-1-yn-1-yl)biphenyl-2-yl]-1-methyl-1H-pyrazole-4-carboxamide, (F372) 5-fluoro-N-[4'-(3-methoxy-3-methylbut-1-yn-1-yl)biphenyl-2-yl]-1,3-dimethyl-1H-pyrazole-4-carboxamide, (F373) 2-chloro-N-[4'-(3-methoxy-3-methylbut-1-yn-1-yl) biphenyl-2-yl] pyridine-3-carboxamide, (F374) (5-bromo-2-methoxy-4-methyl pyridin-3-yl) (2,3,4-trimethoxy-6-methylphenyl) methanone, (F375) N-[2-(4-{[3-(4-chlorophenyl)prop-2-yn-1-yl]oxy}-3-methoxyphenyl)ethyl]-N2-(methyl sulfonyl) valinamide (220706-93-4), (F376) 4-oxo-4-[(2-phenylethyl) amino]butanoic acid, (F377) but-3-yn-1-yl {6-[({[(Z)-(1-methyl-1H-tetrazol-5-yl) (phenyl) methylene]amino}oxy) methyl]pyridin-2-yl}carbamate, (F378) 4-Amino-5-fluoropyrimidin-2-ol (mesomere Form: 6-Amino-5-fluoropyrimidin-2(1H)-on), (F379) propyl 3,4,5-trihydroxybenzoate and (F380) Oryzastrobin.

Other fungicides include benzovindiflupyr (solatenol) dehydrogenase inhibitor (SDHI) pyrazol-carbamide class of fungicides. Examples include henyl-benzamides, phenyl-oxo-ethyl thiophene amide, pyridinyl-ethyl-benzamide, furan-carboxamides, oxathiin-carboxamides, thiazole-carboxamides, pyrazole-carboxamides, pyridine-carboxamides, and combinations thereof.

Illustrative Herbicides

In some embodiments, the pesticide can be or comprise a (chemical) herbicide. A wide variety of (chemical) herbicides are commercially available and known to those skilled in the art, each of which is contemplated herein. Illustrative (chemical) herbicides include, but are not limited to C1) acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxypropionic esters, such as clodinafop-propargyl, cyhalofop-butyl, diclofop-methyl, fenoxaprop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl; C2) acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium. KIH-6127 or pyribenzoxym; sulfonamides, such as florasulam, flumetsulam or metosulam; or sulfonylureas, such as amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron or iodosulfuron; C3) amides, for example allidochlor (CDAA), benzoylpropethyl, bromobutide, chiorthiamid, diphenamid, etobenzanidibenzchlomet), fluthiamide, fosamin or monalide; C4) auxin herbicides, for example pyridinecarboxylic acids, such as clopyralid or picloram; or 2,4-D or benazolin; C5) auxin transport inhibitors, for example naptalame or diflufenzopyr; C6) carotenoid biosynthesis inhibitors, for example benzofenap, clomazone (dimethazone), diflufenican, fluorochloridone, fluridone, pyrazolynate, pyrazoxyfen, isoxaflutole, isoxachlortole, mesotrione, sulcotrione (chlormesulone), ketospiradox, flurtamone, norflurazon or amitrol; C7) enolpyruvylshikimate-3-phosphate synthase inhibitors (EPSPS), for example glyphosate or sulfosate; C8) glutamine synthetase inhibitors, for example bilanafos (bialaphos) or glufosinate-ammonium; C9) lipid biosynthesis inhibitors, for example anilides, such as anilofos or mefenacet; chloroacetanilides, such as dimethenamid, S-dimethenamid, acetochlor, alachlor, butachlor, butenachlor, diethatyl-ethyl, dimethachlor, metazachlor, metolachlor, S-metolachlor, pretilachlor, propachlor, prynachlor, terbuchlor, thenylchlor or xylachlor; thioureas, such as butylate, cycloate, di-allate, dimepiperate, EPTC, esprocarb, molinate, pebulate, prosulfocarb, thiobencarb (benthiocarb), tri-allate or vemolate; or benfuresate or perfluidone; C10) mitosis inhibitors, for example carbamates, such as asulam, carbetamid, chlorpropham, orbencarb, pronamid (propyzamid), propham or tiocarbazil; dinitroanilines, such as benefin, butralin, dinitramin, ethalfluralin, fluchloralin, oryzalin, pendimethalin, prodiamine or trifluralin; pyridines, such as dithiopyr or thiazopyr; or butamifos, chlorthal-dimethyl (DCPA) or maleic hydrazide; C11) protoporphyrinogen IX oxidase inhibitors, for example diphenyl ethers, such as acifluorfen, acifluorfen-sodium, aclonifen, bifenox, chlomitrofen (CNP), ethoxyfen, fluorodifen, fluoroglycofenethyl, fomesafen, furyloxyfen, lactofen, nitrofen, nitrofluorfen or oxyfluorfen; oxadiazoles, such as oxadiargyl or oxadiazon; cyclic imides, such as azafenidin, butafenacil, carfentrazone-ethyl, cinidon-ethyl, flumiclorac-pentyl, flumioxazin, flumipropyn, flupropacil, fluthiacet-methyl, sulfentrazone or thidiazimin, or pyrazoles, such as ET-751.JV 485 or nipyraclofen; C12) photosynthesis inhibitors, for example propanil, pyridate or pyridafol; benzothiadiazinones, such as bentazone; dinitrophenols, for example bromofenoxim, dinoseb, dinoseb-acetate, dinoterb or DNOC; dipyridylenes, such as cyperquat-chloride, difenzoquat-methylsulfate, diquat or paraquat-dichloride; ureas, such as chlorbromuron, chlorotoluron, difenoxuron, dimefuron, diuron, ethidimuron, fenuron, fluometuron, isoproturon, isouron, linuron, methabenzthiazuron, methazole, metobenzuron, metoxuron, monolinuron, neburon, siduron or tebuthiuron; phenols, such as bromoxynil or ioxynil; chloridazon; triazines, such as ametryn, atrazine, cyanazine, desmein, dimethamethryn, hexazinone, prometon, prometryn, propazine, simazine, simetryn, terbumeton, terbutryn, terbutylazine or trietazine; triazinones, such as metamitron or metribuzin; uracils, such as bromacil, lenacil or terbacil; or biscarbamates, such as desmedipham or phenmedipham; C13) synergists, for example oxiranes, such as tridiphane; C14) CIS cell wall synthesis inhibitors, for example isoxaben or dichlobenil; C16) various other herbicides, for example dichloropropionic acids, such as dalapon; dihydrobenzofurans, such as ethofumesate; phenylacetic acids, such as chlorfenac (fenac); or aziprotryn, barban, bensulide, benzthiazuron, benzofluor, buminafos, buthidazole, buturon, cafenstrole, chlorbufam, chlorfenprop-methyl, chloroxuron, cinmethylin, cumyluron, cycluron, cyprazine, cyprazole, dibenzyluron, dipropetryn, dymron, eglinazin-ethyl, endothall, ethiozin, flucabazone, fluorbentranil, flupoxam, isocarbamid, isopropalin, karbutilate, mefluidide, monuron, napropamide, napropanilide, nitralin, oxaciclomefone, phenisopham, piperophos, procyazine, profluralin, pyributicarb, secbumeton, sulfallate (CDEC), terbucarb, triaziflam, triazofenamid or trimeturon; and their environmentally compatible salts, and combinations thereof.

In a preferred embodiment, the herbicide can be or comprise glyphosate (N-(phosphonomethyl)glycine).

Illustrative Plant Growth Regulators (PGRs)

In some embodiments, the plant treatment component can be or comprise one or more PGRs. A wide variety of PGRs are commercially available and known to those skilled in the art, each of which is contemplated herein. Illustrative PGRs include, but are not limited to, D1) Antiauxins, such as clofibric acid, 2,3,5-tri-iodobenzoic acid; D2) Auxins such as 4-CPA, 2,4-D, 2,4-DB, 2,4-DEP, dichlorprop, fenoprop, IAA, IBA, naphthaleneacetamide, a-naphthaleneacetic acids, 1-naphthol, naphthoxyacetic acids, potassium naphthenate, sodium naphthenate, 2,4,5-T; D3) cytokinins, such as 2iP, benzyladenine, 4-hydroxyphenethyl alcohol, kinetin, zeatin; D4) defoliants, such as calcium cyanamide, dimethipin, endothal, ethephon, merphos, metoxuron, pentachlorophenol, thidiazuron, tribufos; D5) ethylene inhibitors, such as aviglycine, 1-methylcyclopropene; D6) ethylene releasers, such as ACC, etacelasil, ethephon, glyoxime; D7) gametocides, such as fenridazon, maleic hydrazide; D8) gibberellins, such as gibberellins, gibberellic acid; D9) growth inhibitors, such as abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid; D10) morphactins, such as chlorfluren, chlorflurenol, dichlorflurenol, flurenol; D11) growth retardants, such as chlormequat, daminozide, flurprimidol, mefluidide, paclobutrazol, tetcyclacis, uniconazole; D12) growth stimulators, such as brassinolide, brassinolide-ethyl, DCPTA, forchlorfenuron, hymexazol, prosuler, triacontanol; D13) unclassified plant growth regulators, such as bachmedesh, benzofluor, buminafos, carvone, choline chloride, ciobutide, clofencet, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, trinexapac, and combinations thereof.

Miscellaneous Illustrative Components

Some embodiments of the present disclosure can include one or more additional components and/or ingredients. For instance, embodiments also include one or more of the following: (1) amino acids, (2) peptides, (3) hydrolyzed proteins, (4) organic and/or carboxylic acids, (5) carbohydrates, (6) plant extracts, (7) lignosulfonates, (8) humic and/or fulvic acids, (9) macro-, secondary-, and/or micronutrients, (10) chelated and/or complex minerals, (11) vitamins, (12) wetting agents, (13) dispersants, and (14) surfactants. Some embodiments can also include one or more diluting agents or diluents. The one or more diluting agents or diluents can dilute one or more of the product components. The one or more diluting agents or diluents can also or alternatively enhance uniform distribution of the plant treatment.

Some embodiments of the present disclosure can include one or more additional (supplementing) components and/or ingredients. For instance, embodiments can include one or more vitamins (e.g., Vitamin A, Vitamin B complex (e.g., Vitamin $B_1$, Vitamin $B_2$, Vitamin $B_3$, Vitamin $B_4$, Vitamin $B_5$, Vitamin $B_6$, Vitamin $B_7$, Vitamin $B_8$, Vitamin $B_9$, Vitamin $B_{12}$, Choline), Vitamin C, Vitamin D, Vitamin E, Vitamin K, etc.), minerals or trace minerals (or elements) (e.g., magnesium, calcium, phosphorus, potassium, sodium, boron, cobalt, chloride, chromium, copper, fluoride, iodine, iron, manganese, molybdenum, selenium, zinc, nickel, vanadium, silicon, tin, etc.), amino acids (e.g., essential and/or non-essential), health supplements (e.g., glucosamine, chondroitin, etc.), pharmaceuticals (e.g., chemical additive, etc.), nutraceuticals, plants or plant parts (e.g., berries, leaves, stems, roots, shoots, seedling, cotyledon, etc.), plant products or extracts (kelp, algae, or other extract), herbs, phytonutrients, carotenoids, enzymes (e.g., amylase, xylanase, proteases, phytase, glucanase), probiotics, organic acids, etc. Certain embodiments can be substantially and/or entirely devoid of probiotic and/or living microorganism of one or more variety.

Certain embodiments can include one or more surfactants, such as a binding and/or emulsifying agent (e.g., diacetyl tartaric acid esters of mono and diglucerides, edible fats and oils, edible fat-forming fatty acids, ethoxylated mono and diglycerides, methyl glucoside coconut oil ester, mineral oil, mono and diglycerides of edible fats or oils or edible fat-forming acids, monosodium phosphate derivatives of mono and diglycerides of edible fats or oils or edible fat-forming fatty acids, polyoxyethylene glycol 400 (mono and dioleates), polysiloxane, polysorbate 80, polysorbate 60 (polyoxy ethylene (20) sorbitan monostearate, propylene glycol, sodium stearoyl lactylate, sorbitan mono-stearate with or without polysorbate 60, etc., or combination thereof.

Some embodiments can include one or more stabilizing, anti-caking, and/or processing agents (e.g., carrageenan, gelatin gum, guar gum, lecithin, locust bean gum, stearic acid, sodiumcarboxy-methyl-cellulose, sodium silico-aluminate, tara gum, xanthan gum, etc.), dust control agents (e.g., mineral oil, paraffin, etc., or a combination of two or more of the foregoing), preservatives, and/or other beneficial ingredients, or combination thereof.

Some embodiments can also include one or more diluting agents or diluents. The one or more diluting agents or diluents can dilute one or more of the products into the mixture. The one or more diluting agents or diluents can also or alternatively enhance uniform distribution of the product or supplement component(s) into the mixture. Illustrative diluting agents or diluents can include, without limitation, water or other aqueous solution, a vitamin and/or mineral mix, an initial portion of the plant treatment component, an earthen carrier, or any other suitable product or supplement component-diluting or distributing element.

Illustrative Combination Products

As used herein, "combination product" and similar terms refer to a composition, mixture, or other combination (e.g., reaction product) that includes at least a plant treatment component and a microbial fermentation product. For instance, the combination product can be, comprise, or include a plant treatment component, a microbial fermentation product, an optional carrier (e.g., to which the microbial fermentation product is applied), and one or more optional additional ingredients (e.g., vitamin(s), mineral(s) or trace mineral(s), amino acid(s), health supplement(s), pharmaceutical(s), nutraceutical(s), plant(s) or plant part(s), plant product(s) or extract(s), herb(s), phytonutrient(s), carotenoid(s), enzyme(s), probiotic(s), organic acids, and/or any other suitable additive or other component, as described above. Certain embodiments can be substantially and/or entirely devoid of probiotic and/or living microorganism of one or more variety.

In at least one embodiment, a combination plant treatment product comprises a microbial fermentation product and, preferably mixed or combined with, a substantially liquid plant treatment component, preferably at a ratio between about 1:1 and about 1:100, fermentation product to plant treatment component, or vice versa. In some embodiments, the ratio of fermentation product to plant treatment component, or vice versa can be up to, between, and/or about 1:1, 1:2, 1:2.5, 1:3, 1:4, 1:5, 1:6, 1:7, 1:8, 1:9, 1:10, or more.

In some embodiments, the plant treatment product can be pre-mixed as a combination product. The combination product can comprise a concentrate, in some embodiments. In at least one embodiment, the combination product can be diluted (e.g., with water) to form an application-ready product. In certain embodiemnts, the product can be mixed or pre-mixed (e.g., tank mixed) at or around the time of application (e.g., in the field). In some embodiemnts, the mixture can be or comprise a suspension, emulsion, solution, etc.

In one or more embodiments, the mixture or combination product can be stabilized, preferably by (1) adjusting the pH of the mixture to about pH 5-7, (2) adding one or more (chemical, synthetic, natural, organic, etc.) stabilizers, (3) adding or co-formulating with water and/or organic mineral oil base, (4) encapsulating the mixture, etc. In some embodiments, the pH of the mixture can be adjusted, if necessary, to about pH 5, 5.5, 6, 6.5, or 7.

One or more alternative or additional embodiments of a combination product comprises a substantially dry fermentation product (e.g., bound to a (solid or dry) carrier) and a substantially dry plant treatment component, preferably at a ratio between about 1:1 and about 1:100, fermentation product-bound carrier to plant treatment component, or vice versa. In some embodiments, the ratio of fermentation product to plant treatment component, or vice versa can be up to, between, and/or about 1:1, 1:2, 1:2.5, 1:3, 1:4, 1:5, 1:6, 1:7, 1:8, 1:9, 1:10, or more.

Some embodiments can include mixing dry (powder) forms of the fermentation product (e.g., bound to a (solid or dry) carrier) and plant treatment component. Certain embodiments can include milling the fermentation product-bound carrier and the plant treatment component to the same or similar particle size. In some embodients, the (dry form) combination product can be water soluble, water miscible, and/or (chemically and/or structurally) configured for producing a stable suspension (e.g., when mixed with an aqueous fluis, such as water).

Methods

At least one embodiment includes a method of producing a plant treatment product, the method comprising providing a plant treatment component and mixing the plant treatment component with the microbial fermentation product. An illustrative method of producing a plant treatment product comprises combining a substantially liquid microbial fermentation product with a plant treatment component preferably at a ratio between about 1:1 and about 1:100, fermentation product to plant treatment component, or vice versa, to form a plant treatment product. One or more alternative or additional embodiments of producing a plant treatment product comprises combining a substantially dry fermentation product (bound or not bound to a carrier) with a plant treatment component preferably at a ratio between about 1:1 and about 1:100, fermentation product to plant treatment component, or vice versa, to form a plant treatment product.

The method of producing a microbial fermentation product can include culturing one or more live and/or viable microorganisms (or microbial species or strains or lines thereof) under anaerobic (and optionally aerobic) conditions (e.g., in a fermentation medium, etc., as known in the art and/or described herein) and/or such that the microorganisms produce at least one fermentation metabolite. Some embodiments can also include (intentionally) killing and/or inactivated (e.g., by lysing, such as by sonication, vigorous mixing, or blending, heat inactivation, pH inactivation or killing, and so forth) such that the fermentation product is substantially devoid of the live and/or viable microorganisms (e.g., substantially devoid of one or more or any living microorganisms). The fermentation product can, however, include one or more (e.g., substantially all) cellular and/or structural components of the microorganisms. The fermentation product can also include at least one fermentation metabolite and/or the fermentation culture medium (or component(s) thereof).

Some embodiments include mixing (or reacting) one or more vitamins and/or minerals with the fermentation product. In particular, one or more of the vitamins and/or minerals can be bound or chelated to at least one of the metabolites of the fermentation product (e.g., such that the bioavailability of the at least one of the metabolites is increased thereby).

At least one embodiment also includes a method of producing a fermentation product-bound carrier. The fermentation product (in substantially liquid form) can be fluidly applied to the carrier, such as by spraying, pouring, dripping, etc. and/or such that the fermentation product binds to the carrier. The carrier can be or comprise a solid and/or substantial dry carrier, such as an earthen carrier, as described herein, optionally comprising one or more phyllosilicates. The carrier can also or alternatively be or comprise a liquid carrier, such as water or a water source or supply, as described herein. The fermentation product can be applied to or combined or mixed with the carrier, such that fermentation product becomes dispersed within or throughout the carrier.

The fermentation product can be applied to the carrier at a ratio of up to, at least, and/or between approximately 1:1 by weight, approximately 1:1.5 by weight, approximately 1:2 by weight, approximately 1:2.5 by weight, approximately 1:3 by weight, approximately 1:3.5 by weight, approximately 1:4 by weight, approximately 1:5 by weight, approximately 1:6 by weight, approximately 1:7 by weight, approximately 1:8 by weight, approximately 1:9 by weight, or approximately 1:10 by weight, fermentation product to carrier, or vice versa. At least a portion of the fermentation product can physically and/or chemically react or mix with and/or bind to the carrier. For instance, at least a portion of the fermentation product can be adsorbed to a surface of the carrier and/or absorbed below the surface of the carrier.

At least one embodiment can include mixing the carrier and/or fermentation product-bound carrier (e.g., before, after, and/or while applying the fermentation product to the carrier). The carrier and/or fermentation product-bound carrier can be mixed in any suitable container or on any suitable surface. For instance, the carrier can be mixed by rotation (e.g., in a drum or barrel), by shaking (e.g., on or in a tray or receptacle), by stirring (e.g., on or in a tray or receptacle), and so forth. In addition, the carrier can be mixed at any suitable speed. Regardless of the specific type of mixing, container, surface, etc., mixing can be measured in terms of revolutions, rotations, and/or reciprocations per minute (rpm). For instance, the carrier can be mixed at a speed of between about 1-500 rpm, between about 5-300 rpm, between about 10-200 rpm, between about 15-100 rpm, between about 20-60 rpm, between about 30-50 rpm, or any range therebetween. In some embodiments, suitable mixing speed can ensure that the carrier, fermentation product-bound carrier, and/or other combination product is appropriately and/or optimally processed. For instance, a mixing speed above a certain threshold can reduce the size and/or uniformity of product particles below an appropriate and/or optimal level. Similarly, a mixing speed below a certain threshold can inhibit sufficient or successful application or coating of the fermentation product around or about the carrier and/or can lead to clumping of the product, causing the size and/or uniformity of product particles to be inappropriate and/or suboptimal. Regardless, the effects of improper mixing can include reduced stability and/or activity of the product.

Certain embodiments can include applying air or a flow of air. The air or flow of air can be applied (i) while mixing the carrier and/or fermentation product-bound carrier (e.g., before, after, and/or while applying the fermentation product to the carrier), (ii) over a specific, predetermined, or defined period of time (e.g., between about 6-120 hours, between about 12-96 hours, between about 12-120 hours, between about 48-60 hours, etc.) and/or (iii) until the fermentation product-bound carrier achieves a suitable moisture content, as described herein. Moreover, the air flow can be applied at a rate of greater than or equal to about 25 $m^3$/minute, up to about 200 $m^3$/minute, between about 25 $m^3$/minute and about 200 $m^3$/minute, between about 40 $m^3$/minute and about 150 $m^3$/minute, between about 50 $m^3$/minute and about 100 $m^3$/minute, or between about 60 $m^3$/minute and about 75 $m^3$/minute, in certain embodiments. Preferably, the air or air flow can be applied at a rate of about 68 $m^3$/minute. In some embodiments, suitable temperature can ensure that the mixture dries to a suitable moisture content in a suitable amount of time, thereby reducing, inhibiting, and/or substantially preventing and/or avoiding product caking or clumping, microbial contamination and/or growth, etc.

In at least one embodiment, the method includes maintaining the carrier, mixed fermentation product and carrier, and/or fermentation product-bound carrier at a suitable reaction temperature (e.g., below about 60° C., below about 58° C., below about 56° C., below about 55° C., below about 52° C., below about 50° C., below about 48° C., below about 45° C., below about 42° C., below about 40° C., below about 39° C., below about 38° C., below about 37° C., below about 35° C., below about 32° C., below about 30° C., below about 25° C., below about 20° C., etc. and/or above about 5° C., above about 10° C., above about 15° C., or above about 20° C.) during the reaction and/or binding process. In some embodiments, suitable reaction temperature can ensure that the reaction occurs at an optimal speed/rate, the reaction product is dried (at a suitable rate) to a suitable moisture content, etc. In addition, the method can include maintaining the reaction product and/or fermentation product-bound carrier at a suitable maintenance and/or storage temperature (e.g., below about 42° C., below about 40° C., below about 39° C., below about 38° C., below about 37° C., below about 35° C., below about 32° C., below about 30° C., below about 28° C., below about 25° C., below about 20° C., below about 15° C., or below about 10° C., below about 5° C., below about 2° C., etc. and/or above about 0° C., above about 2° C., above about 5° C., above about 10° C., or above about 15° C., etc.) after or near completion of the reaction and/or binding process. In some embodiments, a suitable maintenance temperature can improve, enhance, and/or maintain the stability, longevity, and/or composition (i.e., avoiding, reducing, and/or inhibiting decomposition) of the reaction product and/or fermentation product-bound carrier.

In addition, in one or more embodiments, the aforementioned parameters (e.g., mixing, applying, air, temperature, etc.) can cause and/or enhance binding of the fermentation product to the carrier. For instance, the parameters can cause and/or enhance adsorption of the fermentation product to the surface of the carrier, absorption of the fermentation product below the surface of the carrier, and/or drying of the fermentation product on or in the carrier. Thus, the fermentation product can be or become dry-bound to the carrier in some embodiments.

In at least one embodiment, the method can also include maintaining the fermentation product-bound carrier at a suitable reaction pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, etc.) during the reaction and/or binding process. In some embodiments, the suitable pH can ensure and/or enhance the chemical reaction. The method can also include maintaining the fermentation product-bound carrier at a suitable maintenance pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, etc.) after or near completion of the reaction and/or binding process. In some embodiments, the suitable maintenance pH can improve, enhance, and/or maintain the stability, longevity, and/or composition (i.e., avoiding, reducing, and/or inhibiting decomposition) of the reaction product and/or fermentation product-bound carrier. In addition, the suitable maintenance pH can inhibit microbial contamination and/or growth on or in the product (e.g., especially at lower pH). In at least one embodiment, the reaction can have a pH lowering effect (e.g., on the carrier and/or mixture of carrier and fermentation product).

Some embodiments include mixing (e.g., as described above or otherwise mixing) one or more vitamins and/or minerals with the fermentation product-bound carrier (or fermentation product-applied carrier). As indicated above, one or more of the vitamins and/or minerals can be bound or chelated to at least one of the metabolites of the fermentation product (e.g., such that the bioavailability of the at least one of the metabolites is increased thereby). Vitamins and/or minerals can also enhance the nutritional value of the product. Embodiments can also include mixing (e.g., as described above or otherwise mixing) the fermentation product-bound carrier with one or more additional components (e.g., plant extracts, etc.), as described herein.

Some embodiments include a method of manufacturing a plant treatment product. The method can include mixing a plant treatment component with a microbial fermentation product to form a combination plant treatment product. In some embodiments, a plant treatment component is mixed with liquid a microbial fermentation product in a tank mix prior to product distribution. In one or more additional or alternative embodiments, a plant treatment component and a liquid microbial fermentation product are co-formulated. Additional ingredients may be mixed with the plant treatment component and microbial fermentation product. Additional ingredients may include stabilizers, emulsifiers, and/or water or organic mineral oil base. In some embodiments, plant treatment component is mixed with a dry or substantially dry microbial fermentation product (or fermentation product-bound carrier). The plant treatment component and microbial fermentation product may be milled to the same or substantially the same particle size. The plant treatment product resulting from the mixing of the plant treatment component with the microbial fermentation product may be water soluble, forming a stable suspension in water. Embodiments can also include packaging the plant treatment product.

It will be appreciated that certain embodiments of the present disclosure can include a method of enhancing the health of crops. The method can include applying an effective amount of a crop protection product to a plant so as to improve one or more health indicators of the plant or plant population (e.g., as compared to a control). The one or more health indicators can be selected from the group consisting of wilting, coloration, yield, size and/or weight, life span and/or mortality, overall health and appearance, and so forth. The step of applying can comprise spraying and/or distributing a mixture of the plant treatment component and microbial fermentation product on or near the plant such that the plant uptakes the effective amount of the plant treatment product. The plant treatment component and microbial fermentation product can also be applied separately.

In some embodiments, a method includes applying an effective amount of a crop protection product to a seed (e.g., a group of seeds intended for sowing) so as to improve one or more health indicators of the germinating seed and/or later-germinated plant or plant population (e.g., as compared to a control). The one or more health indicators can be selected from the group consisting of stronger germination, wilting, coloration, yield, size and/or weight, life span and/or mortality, overall health and appearance, and so forth.

The step of applying can comprise spraying and/or distributing a plant treatment product (e.g., comprising a mixture of the plant treatment component and microbial fermentation product) on or near the plant, e.g., on the soil, such that the plant uptakes an effective amount of the plant treatment product from the soil. The plant treatment component and microbial fermentation product can also be applying separately. Soil treatment using the disclosed plant treatment product(s) can be performed prior to planting, prior to germination, after germination, and anytime during the life of the plant.

Additional features and advantages of illustrative embodiments of the present disclosure will be set forth in the description which follows, and in part will be obvious from the description, or may be learned by the practice of such illustrative embodiments. The features and advantages of such embodiments may be realized and obtained by means of the instruments and combinations particularly pointed out in the appended claims. These and other features will become more fully apparent from the following description and appended claims, or may be learned by the practice of such illustrative embodiments as set forth hereinafter.

Illustrative Experimental Results

Various plant treatment products comprising (i) select plant treatment components (e.g., pesticides, fungicides, herbicides) and (ii) one or more microbial fermentation product formulations (Composition A, B, C, and combinations) were tested on (1) rice (*Oryza sativa*) infected by Sheath Blight *Rhizoctonia solani*, (2) soybean (*Glycine max*) infected by Soybean Rust (*Phakopsora pachyrhizi*), (3) wheat (*Triticum aestivum*) infected by Stripe Rust (*Puccinia striiformis*), (4) corn (*Zea mays*) infected by Gray Leaf Spot (*Cercospora zeae-maydis*), (5) creeping bentgrass (*Agrostis stolonifera*) infected by dollar spot (*Sclerotina homoeocarpa*), and (6) glyphosate-tolerant Palmer Amaranth (*Ama-

*ranthus palmeri*) weed, and compared to controls, including plant treatment component(s) alone.

The microbial fermentation product formulations designated as Composition A, B, C, and D are in accordance with the microbial fermentation products described in the present disclosure. Each of Compositions A, B, C, and D comprises cellular material of fermentation cultured microorganisms and anaerobic metabolites produced by the cultured microorganisms. In particular, each of Composition A, B, C, D comprises a whole culture lysate of a *Lactobacillus* fermentation suspension culture, and includes (i) components of the fermentation culture media, (ii) cellular material of lysed *Lactobacillus* sp. bacteria, and (iii) anaerobic metabolites produced by the *Lactobacillus* sp. bacteria. Differences between Compositions A, B, C, D are generally in the concentration of various amino acids, minerals, and/or organic acids added to the fermentation product. Each of the fermentation product formulations (or Compositions) is (substantially or entirely) devoid of living microorganisms from the fermentation culture. The plant treatment products were applied in liquid form, and were not bound to or coated about urea granules or pellets or other urea-nitrogen-based fertilizers (e.g., in solid, granular, or pellet form). Indeed, each of the plant treatment products were substantially devoid of (granular or pellet) urea and other urea-nitrogen-based fertilizers (e.g., in solid, granular, or pellet form).

To test the effect of the inventive plant treatment products on Sheath Blight caused by *Rhizoctonia solani* in rice, the respective plant treatment products (fungicide+Compositions A, Composition B, or Composition A+B) or fungicide (alone) were applied to the rice plants, in field conditions, three times at a rate of 500 ml/ha: 1) at 4-5 leaf stage/beginning tillering, 2) 10-14 days prior to *Rhizotonia solani* inoculation, and 3) at the beginning of boot stage. Fungicide tested was Quadris® (azoxystrobin) at a rate of 0.7 l/ha (100%) and 0.35 l/ha (50%). Plants were given a disease score ranging from 0 to 9, with 0 meaning the plant had no disease and 9 meaning the plant exhibited severe symptoms of disease (i.e. dead leaves). See Tables 1-3. Surprising, statistically significant improvement of disease control over fungicide alone was obtained with each of the plant treatment products, at 100% fungicide rate and 50% fungicide rate. Thus, the inventive plant treatment product can improve the fungicidal activity or effect of fungicide treatment.

TABLE 1

Disease score in rice in field conditions (*Rhizotonia solani* infection)

| Untreated Control | Full Fungicide rate (100%) | Reduced Fungicide rate (50%) | Composition A | 100% Fungicide plus Composition A | 50% of Fungicide plus Composition A |
|---|---|---|---|---|---|
| 8.1 a | 4.9 c | 5.4 c | 7.1 b | 3.0 e | 4.0 d |
| — | −39.5% | −33.3% | −12.3% | −63.0% | −50.6% |

TABLE 2

Disease score in rice in field conditions (*Rhizotonia solani* infection)

| Untreated Control | Full Fungicide rate (100%) | Reduced Fungicide rate (50%) | Composition B | 100% Fungicide plus Composition B | 50% of Fungicide plus Composition B |
|---|---|---|---|---|---|
| 8.1 a | 4.9 c | 5.4 c | 7.0 b | 3.0 e | 3.9 d |
| — | −39.5% | −33.3% | −13.6% | −63.0% | −51.9% |

TABLE 3

Disease score in rice in field conditions (*Rhizotonia solani* infection)

| Untreated Control | Full Fungicide rate (100%) | Reduced Fungicide rate (50%) | Composition A + B | 100% Fungicide plus Composition A + B | 50% of Fungicide plus Composition A + B |
|---|---|---|---|---|---|
| 8.1 a | 4.9 c | 5.4 c | 6.5 b | 3.0 e | 2.8 d |
| — | −39.5% | −33.3% | −19.8% | −63.0% | −65.4% |

To test the effect of the inventive plant treatment product on (Asian) Soybean Rust caused by *Phakopsora pachyrhizi* in soybeans, and corresponding soybean yields, the plant treatment product (Composition A+fungicide) or fungicide components (alone) were applied to soybean plants, in field conditions. Composition A was applied at a rate of 0.5 l/ha at V4 stage and again with the plant treatment component, fungicide, Mazen® (Solatenol with Azoxystrobin) at 0.3 kg/ha at R1, R2, R3 and R3/R4. The results were compared to the untreated control. See Tables 4-5. Surprising, Composition A applied with the fungicide decreased disease severity (%) and increased yield (kg/ha) in soybean, as compared to fungicide alone. Thus, the inventive plant treatment product can improve the fungicidal activity or effect of fungicide treatment, and improve yield following fungicide treatment. Similar results were observed for the fungicide, Cripton® (Prothioconozole with Trifloxystrobin) (data not shown).

TABLE 4

Disease severity (%) in soybean in field conditions
(*Phakopsora pachyrhizi* infection)

| Untreated Control | Fungicide | Fungicide plus Composition A |
|---|---|---|
| 20.9 | 12.7 | 11.4 |
| — | −39.2% | −45.5% |

TABLE 5

Soybean yield (kg/ha) in field conditions
(*Phakopsora pachyrhizi* infection)

| Untreated Control | Fungicide | Fungicide plus Composition A |
|---|---|---|
| 2839 a | 3021 ab | 3270 b |
| — | +6.4% | +15.2% |

To test the effect of the inventive plant treatment product on Stripe Rust caused by *Puccinia striiformis* in wheat, and corresponding wheat yields, the plant treatment product (Composition A+fungicide) or fungicide component (alone) were applied to wheat plants, in field conditions. Composition A was applied at a rate of 0.5 l/ha at the 4-5 leaf stage, at the second node stage and was combined with the plant treatment component fungicide Quilt® (Azoxystrobin with Propiconazole) at 1 l/ha at early boot stage. The results were compared to the untreated control. See Tables 6-7. Surprising, Composition A applied with the fungicide decreased infection severity (%) in wheat and increased yield (kg/ha) in wheat, as compared to fungicide alone. Thus, the inventive plant treatment product can improve the fungicidal activity or effect of fungicide treatment, and improve yield following fungicide treatment.

TABLE 6

Disease severity (%) in wheat in field conditions
(*Puccinia striiformis* infection)

| Untreated Control | Fungicide | Fungicide plus Composition A |
|---|---|---|
| 52.2 a | 30.0 b | 25.6 b |
| — | −42.5% | −51% |

TABLE 7

Wheat yield (kg/ha) in field conditions
(*Puccinia striiformis* infection)

| Untreated Control | Fungicide | Fungicide plus Composition A |
|---|---|---|
| 5596 a | 6543 b | 7256 c |
| — | +16.9% | +29.7% |

To test the effect of the inventive plant treatment product on Gray Leaf Spot caused by *Cercospora zeae-maydis* in corn, and corresponding corn yields, the plant treatment product (Composition A+Composition B+fungicide) or fungicide component (alone) were applied to corn, in field conditions. The plant treatment product was applied at a rate of 7 fl oz/acre of Composition A, 7 fl oz/acre of Composition B, and 5.5 fl oz/acre of the plant treatment component fungicide Quilt® (Azoxystrobin with Propiconazole), and compared to the plant treatment component fungicide Quilt® (Azoxystrobin with Propiconazole) alone, applied at a rate of 5.5 fl oz/acre. The results were compared to the untreated control. See Table 8. Surprising, the combination of Composition A and Composition B with the fungicide decreased infection severity (%) in corn, as compared to fungicide alone. Thus, the inventive plant treatment product can improve the fungicidal activity or effect of fungicide treatment.

TABLE 8

Disease severity (%) in corn in field conditions
(*Cercospora zeae-maydis* infection)

| Untreated Control | Fungicide | Fungicide plus Composition A + B |
|---|---|---|
| 14.3 a | 4.8 b | 3.9 b |
| — | −66.4% | −72.7% |

To test the effects of the inventive plant treatment product on weed survival in herbicide-tolerant Palmer Amaranth (*Amaranthus palmeri*) plants, the plant treatment product (Composition C+herbicide) or herbicide component (alone) were applied to weeds, in greenhouse conditions. The plant treatment product was applied at a rate of 1 liter/ha Composition C and 1.27 kg/ha of the active herbicide ingredient, glyphosate, (diluted with water and applied as fine mist spray with delivery rate of 260 liter/ha to approximately 15 cm tall, glyphosate-tolerant Palmer Amaranth plants), and compared to herbicide alone. The measurements of dry shoot mass and dry root mass were taken two weeks after spraying. The results were compared to the untreated control and herbicide alone. See Tables 9-10. Surprising, Composition C with herbicide reduces shoot and root weight, as compared to herbicide alone, in herbicide-tolerant plants. Thus, the inventive plant treatment product can enhance herbicide susceptibility in herbicide-tolerant plants.

TABLE 9

Palmer Amaranth shoot fresh/dry weight per plant
in greenhouse conditions

| Untreated Control | Herbicide | Herbicide plus Composition C |
|---|---|---|
| 18.9/5.71 | 15.0/5.31 | 8.73/3.37 |
| — | −20.6/−7.01% | −53.8/−41.0% |

TABLE 10

Palmer Amaranth root fresh/dry weight per plant in
greenhouse conditions

| Untreated Control | Herbicide | Herbicide plus Composition C |
|---|---|---|
| 9.65/1.30 | 4.70/0.768 | 2.37/0.416 |
| — | −51.3/−40.9% | −75.4/−68.0% |

To test the effect of the inventive plant treatment product on dollar spot (*Sclerotina homoeocarpa*) infection in creeping bentgrass, the plant treatment product (Composition D+fungicide) or fungicide component (alone) were applied to creeping bentgrass, in greenhouse conditions. Composition D was applied to creeping bentgrass at a rate of 500 ml/ha in combination with the broad spectrum fungicide, Daconil Ultrex® (Chlorothalonil) at a reduced rate of 2.6 oz/1000 square feet, and compared to the application of the fungicide alone at a full rate of 3.25 oz/1000 square feet. The results were compared to the untreated control. See Table 11. Surprising, Composition D applied with a reduced amount of the fungicide decreased infection severity (%) and was comparable to the full rate of fungicide alone. Thus, the inventive plant treatment product can achieve full fungicidal benefits with decreased chemical fungicide application or use.

TABLE 11

Infection severity (%) in creeping bentgrass in greenhouse conditions (*Sclerotina homoeocarpa* infection)

| Untreated Control | Fungicide at full rate | Fungicide at reduced rate plus Composition D |
|---|---|---|
| 143.8 a | 3.5 b | 3.8 b |
| — | −97.6% | −97.4% |

Statistical significance of the results is indicated by a letter (or letter combination) indicator following each data number. Numbers within a row that that do not share at least one letter indicator have a statistically significant difference. In other words, the difference between any two numbers in the same row is statistically significant; (P<0.05) calculated using Fisher's protected LSD test (or Least Significant Difference), if the two numbers do not have at least one letter indicator in common.

CONCLUSION

Without being bound to any theory, the beneficial effects of the plant treatment products of the present disclosure, including but not limited to decreasing disease/infection, improving yield, and enhancing herbicide-sensitivity, may be, at least in part, due to molecular and/or biochemical effects of the microbial fermentation product on plants treated with plant treatment components. Various plant treatment components, as described herein, can have beneficial effects on plant to which they are applied. For instance, chemical fungicides can reduce disease caused by fungal infection and thereby improving yield through reducing the loss of plant biomass and production. However, chemical fungicides may also place significant (biotic) stress on the plants. For example, chemical fungicide application may cause or illicit changes in plant gene expression and other molecular and/or biochemical responses. Embodiments of the present disclosure may provide beneficial effects through attenuating certain negative or detrimental effects of plant treatment components on plants. For instance, embodiments of the present disclosure have been shown to beneficially alter gene expression (profiles) for genes related to pathogenesis, as well as oxidative stress (e.g., superoxide dismutase). Thus, plants to which the inventive plant treatment products are applied can receive the benefits of the chemical plant treatment component(s), but with a reduction in the negative or detrimental (side) effects, such as oxidative stress. Moreover, the fermentation product of the present disclosure may work synergistically with the plant treatment component in providing beneficial pesticidal and plant growth properties.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

Disclosure of certain features relative to a specific embodiment of the present disclosure should not be construed as limiting application or inclusion of said features to the specific embodiment. Rather, it will be appreciated that other embodiments can also include said feature without necessarily departing from the scope of the present disclosure. In particular, products and/or methods according to certain embodiments of the present disclosure may include, incorporate, or otherwise comprise properties, features (e.g., ingredients, components, members, elements, parts, and/or portions), steps, etc. described in other embodiments disclosed and/or described herein. Accordingly, the various features of certain embodiments can be compatible with, combined with, included in, and/or incorporated into other embodiments of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:
1. A system, comprising:
glyphosate (N-(phosphonomethyl) glycine); and
a bacterial fermentation product, comprising a whole culture lysate of a bacterial fermentation culture, the whole culture lysate comprising:
fermentation culture media;
lysed *Lactobacillus* sp. bacteria; and
anaerobic metabolites of the lysed *Lactobacillus* sp. bacteria,
wherein the bacterial fermentation product is substantially devoid of living microorganisms, and wherein the system is substantially devoid of:
urea;

nitrogen-based fertilizer; and cellular material of fungi and yeast, and wherein the bacterial fermentation product enhances glyphosate susceptibility in a glyphosate-tolerant plant when the bacterial fermentation product is applied to the glyphosate-tolerant plant.

2. The system of claim 1, wherein the glyphosate and the bacterial fermentation product are mixed together in liquid form.

3. The system of claim 1 further comprising one or more additives selected from the group consisting of amino acids, peptides, hydrolyzed proteins, organic acids, carboxylic acids, carbohydrates, plant extracts, lignosulfonates, humic and/or fulvic acids, macro-nutrients, secondary-nutrients, micro-nutrients, minerals, trace minerals, chelated minerals, complex minerals, vitamins, wetting agents, dispersants, and surfactants.

4. The system of claim 1, wherein the bacterial fermentation product includes:

cellular material of one or more additional microbial species and/or strains; and one or more anaerobic metabolite products of the one or more additional microbial species and/or strains.

5. The system of claim 1, wherein the glyphosate is in liquid form and the bacterial fermentation product is in liquid form, and wherein the glyphosate and the bacterial fermentation product are optionally combined to form a liquid mixture.

6. A product, comprising:

glyphosate (N-(phosphonomethyl) glycine); and a bacterial fermentation product, comprising a whole culture lysate of a bacterial fermentation culture, the whole culture lysate comprising:

fermentation culture media;

lysed Lactobacillus sp. bacteria; and anaerobic metabolites of the lysed *Lactobacillus* sp. bacteria, wherein the product is substantially devoid of urea and nitrogen-based fertilizers, wherein the-microbial bacterial fermentation product is devoid of living microorganisms, and wherein the bacterial fermentation product enhances glyphosate susceptibility in a glyphosate-tolerant plant when the bacterial fermentation product is applied to the glyphosate-tolerant plant.

7. The product of claim 6, wherein the glyphosate and the bacterial fermentation product are mixed together in liquid form.

8. The product of claim 6 further comprising one or more additives selected from the group consisting of amino acids, peptides, hydrolyzed proteins, organic acids, carboxylic acids, carbohydrates, plant extracts, seaweed extract, lignosulfonates, humic acids, fulvic acids, macro-nutrients, secondary-nutrients, micro-nutrients, minerals, trace minerals, chelated minerals, complex minerals, vitamins, wetting agents, dispersants, and surfactants.

9. A product, comprising:

glyphosate (N-(phosphonomethyl) glycine); and a bacterial fermentation product, comprising a whole culture lysate of a bacterial fermentation culture, the whole culture lysate comprising:

lysed *Lactobacillus* sp. bacteria;

fermentation metabolites of the lysed Lactobacillus sp. bacteria; and fermentation culture media, wherein the product is substantially devoid of urea and nitrogen-based fertilizers, wherein less than about 5% of biomass in the-microbial bacterial fermentation product is living or viable microorganisms, and wherein the bacterial fermentation product enhances glyphosate susceptibility in glyphosate-tolerant plants when the bacterial fermentation product is applied thereto.

10. The product of claim 9, wherein the glyphosate and the bacterial fermentation product are mixed together in liquid form.

11. The product of claim 9, wherein the bacterial fermentation product is substantially devoid of one or more living microorganisms.

12. The product of claim 9 further comprising one or more additives selected from the group consisting of amino acids, peptides, hydrolyzed proteins, organic acids, carboxylic acids, carbohydrates, plant extracts, seaweed extract, lignosulfonates, humic acids, fulvic acids, macro-nutrients, secondary-nutrients, micro-nutrients, minerals, trace minerals, chelated minerals, complex minerals, vitamins, wetting agents, dispersants, and surfactants.

13. The product of claim 9, wherein the glyphosate and the bacterial fermentation product are mixed together in liquid form and the bacterial fermentation product is substantially devoid of one or more living microorganisms.

* * * * *